United States Patent
Li

(10) Patent No.: US 7,359,224 B2
(45) Date of Patent: Apr. 15, 2008

(54) DIGITAL IMPLEMENTATION OF POWER FACTOR CORRECTION

(75) Inventor: Yong Li, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 91 days.

(21) Appl. No.: 11/411,718

(22) Filed: Apr. 26, 2006

(65) Prior Publication Data

US 2006/0245219 A1 Nov. 2, 2006

Related U.S. Application Data

(60) Provisional application No. 60/675,541, filed on Apr. 28, 2005.

(51) Int. Cl.
*G05F 1/70* (2006.01)

(52) U.S. Cl. .................................................. 363/89

(58) Field of Classification Search ................ 323/207; 363/89
See application file for complete search history.

(56) References Cited

U.S. PATENT DOCUMENTS

| | | | |
|---|---|---|---|
| 5,003,454 A * | 3/1991 | Bruning | 363/81 |
| 5,638,265 A * | 6/1997 | Gabor | 363/89 |
| 5,801,935 A * | 9/1998 | Sugden et al. | 363/89 |
| 6,215,287 B1 | 4/2001 | Matsushiro et al. | 323/222 |
| 6,320,772 B1 * | 11/2001 | Doyama et al. | 363/89 |
| 6,728,121 B2 * | 4/2004 | Ben-Yaakov et al. | 363/89 |
| 6,738,274 B2 | 5/2004 | Prasad et al. | 363/70 |
| 7,042,743 B2 * | 5/2006 | Pidutti et al. | 363/89 |
| 7,088,081 B2 | 8/2006 | Takahashi et al. | 323/222 |
| 7,164,591 B2 * | 1/2007 | Soldano | 363/89 |
| 7,183,753 B2 * | 2/2007 | Tsuruya | 323/222 |
| 7,239,120 B2 * | 7/2007 | Adragna et al. | 323/285 |
| 7,257,010 B2 * | 8/2007 | Takahashi | 363/89 |
| 2005/0270813 A1 * | 12/2005 | Zhang et al. | 363/89 |
| 2006/0013026 A1 * | 1/2006 | Frank et al. | 363/89 |
| 2006/0245219 A1 * | 11/2006 | Li | 363/89 |

OTHER PUBLICATIONS

International Search Report dated Oct. 10, 2006.

* cited by examiner

*Primary Examiner*—Jeffrey Sterrett
(74) *Attorney, Agent, or Firm*—Ostrolenk, Faber, Gerb & Soffen, LLP

(57) ABSTRACT

A circuit for providing power factor correction in accordance with an embodiment of the present application may include a boost converter circuit and a control circuit receiving as inputs a rectified AC input voltage from a rectifier, a signal proportional to current through the boost inductor and the DC bus voltage across the capacitor of the boost converter. The control circuit provides a pulse width modulated signal to control the on time of a PFC switch. The control circuit further includes a voltage regulator and a current regulator. The current regulator includes a difference device operable to subtract a signal proportional to the inductor current from the current reference signal, a PI controller adapted to receive the output of the difference device and provide a first control signal, a feed forward device operable to receive the rectified AC input voltage and to provide a second control signal with a smaller dynamic range than the AC input voltage, and an adder operable to add the first control signal to the second control signal to provide a PWM reference signal for generating the pulse width modulated signal. A zero crossing detector and vector rotator may be provided to provide a clean sinusoidal reference to the current regulator. A partial PFC regulator may be provide to provide partial mode PFC if desired.

20 Claims, 18 Drawing Sheets

Conventional Full-Mode PFC

Proposed High-Frequency Partial-Mode PFC (IR Patent Pending)

20kHz AD sampling, 40kHz PWM switching

DIGITAL IMPLEMENTATION OF POWER FACTOR CORRECTION

CROSS-REFERENCE TO RELATED APPLICATIONS

This application claims benefit of a priority to Provisional Application Ser. No. 60/675,541 filed Apr. 28, 2005 entitled DIGITAL IMPLEMENTATION OF PFC, the entire contents of which are hereby incorporated by reference herein.

This application is also related to U.S. patent application Ser. No. 11/267,516 entitled DIGITAL CONTROL OF BRIDGELESS POWER FACTOR CORRECTION CIRCUIT filed Nov. 4, 2005 which claims benefit of and priority to U.S. Provisional Application Ser. No. 60/626,117 filed Nov. 8, 2004 entitled DIGITAL CONTROL OF BRIDGELESS POWER FACTOR CORRECTION CIRCUIT, the entire contents of which are hereby incorporated by reference herein.

BACKGROUND OF THE INVENTION

The present application relates to power factor correction circuits, that is, circuits for reducing the distortion and harmonics generated in a power line feeding a power supply, and in particular a switch mode power supply to make the circuit, including the attached load appear to be a substantially resistive load. More specifically, the present application relates to a control circuit for use in digital control of a power factor correction circuit to ensure that the AC voltage and current are substantially in phase which improves efficiency and at the same time eliminates the generation of harmful harmonics.

FIG. 1 illustrates a conventional boost power factor correction circuit 10 and a control circuit therefor 20. The rectified AC voltage is provided to boost inductor L. A PFC switch Q1 is coupled in series with the inductor and across the output of the bridge rectifier (BR) after the inductor L. The boost diode BD is coupled in series with the inductor L and the output capacitor COUT is coupled to the output of the boost converter circuit in a known fashion. The voltage across capacitor COUT is the DC bus voltage and is provided to the LOAD.

The control circuit 20 is used to control the PFC circuit 10. In the control circuit 20, the DC bus voltage V_DC is provided to an analog to digital (A/D) converter 12 which also receives the current I_IN of the inductor L as sensed by a resistor RI or by other sensing means, and the rectified AC input voltage V_IN. The A/D converter 12 produces three outputs comprising digital implementations of the DC bus voltage V_DC (VdcFdb), the input voltage V_IN (V_IN') and the inductor current I_IN (I_IN'). While a digital implementation is illustrated, it is noted that substantially the same process is performed in a totally analog circuit as well.

A ramp generator 14 receives DC reference voltage Vdc_Ref. The output of the ramp generator 14 is provided to a difference circuit 16 in which the digitized DC bus voltage VdcFdb is subtracted from the ramp voltage. This is fed to a voltage regulator which may comprise a proportional integrator (PI) controller 18. The output of the PI controller 18 is fed to a multiplier circuit 22 wherein the voltage output from the voltage regulator (PI controller 18) and the input voltage V_IN' are multiplied. This results in a current reference PFC signal IREF_PFC, from which the inductor current I_IN' is subtracted in a difference stage 24. The output of this difference stage 24 is fed to a current regulator comprising a PI controller 26. The output of the PI controller 26, CAOut, is fed to a comparator 28 wherein the PWM signal is generated by comparing an oscillator signal, typically a ramp or sawtooth signal 30 generated by an oscillator with the output (CAOut) of the controller 28. The output, PWM_PFC, controls the duty cycle of the PWM signal provided to control the switch Q1 and thereby control the power factor correction. A PFC enable signal 32 may be provided to blocks 14, 18, 26 and 28 to disable PFC operation from another circuit.

As noted above, the control circuit 20 illustrated in FIG. 1, while a digital circuit, is substantially similar to an analog circuit used to control PFC. The digital PFC control circuit 20, however, has certain inherent limitations, in particular, based on the fact that it is a digital circuit. FIG. 3 illustrates that the key to PFC control is the current regulation loop, which forces the inductor current waveform to track the rectified half wave sinusoidal reference IREF_PFC. This regulation is typically performed entirely by PI controller 26. PI controllers are typically good at regulating signals that have a steady state of a constant DC value, but are not typically useful for regulating a time-varying signal, such as a sinusoidal current, unless the control bandwidth of the controller is very high. In the PFC control setting, however, the inductor current is always changing in a sinusoidal fashion. Thus, there is no steady state signal for the PI controller to regulate. In addition, the sample-hold (S/H) delay that is inherent to the analog to digital (A/D) conversion process introduces further complications.

The S/H delay may be expressed as follows:

$$H(s) = \frac{1 - e^{-T_s \cdot s}}{s} \approx \frac{1}{1 + \frac{T_s \cdot s}{2}}, \qquad \text{Eq. 1.1}$$

where $T_s$ is the sampling period. The approximation indicated above is valid when $T_s$ is sufficiently short. As illustrated in FIG. 4, the longer the sampling period $T_s$, the larger the phase shift. The phase shift will reduce the margin of the closed loop gain and affect the system stability. In order to maintain the stability of the closed loop control, the gain and bandwidth of the PI controller 26 should be reduced. However, as noted above, when the gain and bandwidth of the PI controller 26 are reduced, the PI controller will not be able to track the sinusoidal reference signal which will result in higher distortion and a lower power factor. FIGS. 5A and 5B illustrate test waveforms of a bridgeless PFC circuit using conventional digital control and a 20 kHz A/D sampling rate under heavy load (5A) and light load (5B), respectively. As illustrated, there is significant distortion and oscillation in the current waveforms. The distortion is such that the circuit would not meet the EN61000-3-2 Class A harmonic standard.

Further, the PWM stage 28, itself, may cause problems. PFC modeling theory indicates that the PWM stage has a sample-data effect similar to the sample and hold (S/H) delay in digital control discussed above. Thus, even if an analog control circuit is used, when the PWM carrier frequency is too low, the current control performance may still be undesirable. However, in an analog control circuit, the PWM carrier frequency normally is relatively high, typically in the range of 50 kHz to 100 kHz. Thus, the current loop bandwidth can be designed to be around 5 kHz-10 kHz. At this frequency, the current can be controlled to have relatively good tracking of the sinusoidal reference. That is, the limitations of the analog control circuit are somewhat "disguised." Nevertheless, at high switching frequencies, undesirable switching losses and EMI noise are present even in analog control circuits. Digital control may address these problems, but brings its own problems, as noted above.

One solution has been to use a higher sampling rate in the A/D process, which results in a smaller $T_s$ and reduces the phase shift. While this improves current waveform control, it significantly increases the cost of the digital IC since high speed A/D conversion is necessary along with high computation power in the digital processor. While the problems discussed above are discussed with reference to the conventional boost PFC circuit 10 of FIG. 1, it is noted that the same problems arise using the bridgeless PFC circuit 10a of FIG. 2, for example.

FIG. 1A illustrates another embodiment of a PFC control circuit that utilizes partial mode PFC and PWM blanking as is described, for example, in U.S. patent application Ser. No. 11,269,377 entitled HIGH FREQUENCY PARTIAL BOOST POWER FACTOR CORRECTION CONTROL CIRCUIT AND METHOD filed Nov. 4, 2005 as a continuation in part of application Ser. No. 11/165,939 filed Jun. 24, 2005, entitled HIGH FREQUENCY PARTIAL BOOST POWER FACTOR CORRECTION CONTROL CIRCUIT AND METHOD which claims the benefit and priority of Provisional Application Ser. No. 60/583,752 filed Jun. 28, 2004, entitled A NEW HIGH-FREQUENCY PARTIAL BOOST POWER-FACTOR-CORRECTION CONTROL METHOD, the entire disclosure of each of which is hereby incorporated by reference herein. A PWM blanking algorithm is further described therein and also in Provisional Application Ser. No. 60/626,113 filed Nov. 8, 2004 entitled PWM BLANKING ALGORITHM IN HIGH FREQUENCY PARTIAL PFC and Provisional Application Ser. No. 60/626,112 filed Nov. 8, 2004 entitled DC BUS VOLTAGE CONTROL METHOD IN HIGH-FREQUENCY PARTIAL PFC, the entire disclosures of which are hereby incorporated by reference herein.

In partial mode PFC, a partial PFC controller 90 is fed the instantaneous rectified AC input voltage and the instantaneous DC bus voltage and compares the two. When the rectified AC input voltage (V_IN) is less than the DC bus voltage (V_DC), partial PFC controller 90 provides a signal to the PWM comparator 28 to enable the PWM comparator, thereby providing PWM signals to control the on time of switch Q1. When V_IN is greater than V_DC, that is, when the rectified AC input voltage is greater than the DC input voltage, PWM switching of the switch Q1 is not necessary for many applications, and therefore the generation of PWM switching signals is disabled. Partial PFC controller 90 provides a shutdown signal to the PWM comparator 28 to disable the PWM operation and accordingly switch Q1 is maintained in an off state. Such partial mode PFC is useful since PFC is not necessary in some applications and thus it is advantageous to interrupt it under certain conditions. However, while PWM operation is active the same problems arise with regard to distortion in waveforms as discussed below.

An example of a PFC circuit utilizing partial mode PFC is illustrated in FIG. 1A. The circuit of FIG. 1A is substantially similar to that of FIG. 1 except for the inclusion of the partial PFC controller 90. Thus, common elements of the circuit of FIG. 1A are labeled with the same reference numerals as in FIG. 1. FIG. 5C illustrates waveforms for convention full PFC control circuits and the Partial PFC control circuit suggested in FIG. 1A, respectively. Further, FIGS. 5D and 5E illustrate the advantage that partial mode PFC provides over full PFC with regard to Power Factor and Efficiency. FIG. 5F further illustrates the improved EMI affects provided by partial mode PFC as compared to full boost PFC. FIG. 5G further illustrates the improvement provided by partial mode PFC when compared to full boost PFC with regard to EN61000-3-2 Class A harmonic standard. Thus, there are several advantages of using partial PFC, however, the sinusoidal waveform provided using partial mode PFC has the same distortion problems as the conventional circuit of FIG. 1, for example.

Thus, it is desirable to provide an alternative digital control circuit and method that avoids the problems mentioned above.

SUMMARY OF THE INVENTION

It is an object of the present invention to provide digital control of power factor correction that avoids the problems noted above.

A circuit for providing power factor correction in accordance with an embodiment of the present application includes a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor and a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch. The control circuit further includes a voltage regulator providing a regulated voltage signal based on a reference voltage and the DC bus voltage, a multiplier operable to multiply the regulated voltage signal by the rectified input voltage to provide a current reference signal and a current regulator receiving the current reference signal and the signal proportional to the inductor current. The current regulator further includes a difference device operable to subtract the signal proportional to the inductor current from the current reference signal, a PI controller adapted to receive the output of the difference device and provide a first control signal, a feed forward device operable to receive the rectified AC input voltage and to provide a second control signal, wherein the second control signal has a smaller dynamic range than the AC input voltage, an adder operable to add the first control signal to the second control signal to provide a PWM reference signal and a pulse width modulated generator operable to provide the pulse width modulated signal to control the on time of the PFC circuit, wherein the pulse width modulated generator utilizes the PWM reference signal to generate the pulse width modulated signal.

A circuit for providing power factor correction in accordance with another embodiment of the present invention includes a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor and a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch. The control includes a voltage regulator providing a regulated voltage signal based on a reference voltage and the DC bus voltage, a zero crossing detector receiving the rectified AC voltage and providing an angle signal indicating a phase of the input AC voltage, a vector rotator adapted to receive the angle signal and the rectified AC voltage and to provide a clean sinusoidal reference signal in phase with the input AC voltage, a multiplier operable to multiply the regulated voltage signal by the clean sinusoidal reference signal to provide a current reference signal, a current regulator receiving the current reference and the signal proportional to the inductor current and providing a PWM reference signal, and a pulse width modulated generator operable to provide the pulse width modulated signal to control the on time of the PFC circuit, wherein the pulse width modulated generator utilizes the PWM reference signal to generate the pulse width modulated signal.

A circuit for providing power factor correction in accordance with a further embodiment of the present invention includes a bridgeless boost converted circuit, an input circuit for an AC line voltage, a control circuit receiving the AC line voltage, the control circuit being operative to provide a pulse width modulated signal to control the on time of a PFC switch of the bridgeless boost converter circuit. The control circuit includes a scaling device operable to scale down the AC line voltage from bipolar to uni-polar form, an analog to digital converter operable to convert the unipolar AC voltage into digital data, a digital rectifier operable to process the digital data of the Uni-polar AC voltage to provide a half-sinusoidal AC signal that is proportional to and in phase with the input AC line voltage, a voltage regulator providing a regulated voltage signal based on a reference voltage and the DC bus voltage, a multiplier operable to multiply the regulated voltage signal by the rectified input voltage to provide a current reference signal and a current regulator receiving the current reference and the signal proportional to the inductor current. The current regulator includes a difference device operable to subtract the signal proportional to the inductor current from the current reference signal, a PI controller adapted to receive the output of the difference device and to provide a control signal, a feed forward loop device operable to receive the rectified AC input voltage and to provide a second control signal, wherein the second control signal has a smaller dynamic range than the rectified AC input voltage, an adder operable to add the first control signal to the second control signal to provide a PWM reference signal and a pulse width modulated generator operable to provide the pulse width modulated signal to control the on time of the PFC circuit, wherein the pulse width modulated generator utilizes the PWM reference signal to generate the pulse width modulated signal.

A digital control circuit for use with a power factor correction circuit in accordance with an embodiment of the present application includes a voltage regulator providing a regulated voltage signal based on a reference voltage and a DC bus voltage of the power factor correction circuit, a multiplier operable to multiply the regulated voltage signal by a rectified input voltage of the power factor correction circuit to provide a current reference signal, a current regulator receiving the current reference signal and a signal proportional to an inductor current of the power factor correction circuit. The current regulator includes a difference device operable to subtract the signal proportional to the inductor current from the current reference signal, a PI controller adapted to receive the output of the difference device and provide a first control signal, a feed forward device operable to receive the rectified input voltage and to provide a second control signal, wherein the second control signal has a smaller dynamic range than the AC input voltage of the power factor correction circuit, an adder operable to add the first control signal to the second control signal to provide a PWM reference signal and a pulse width modulated signal generator operable to provide a pulse width modulated signal to control the on time of the power factor correction circuit, wherein the pulse width modulated signal generator utilizes the PWM reference signal to generate the pulse width modulated signal.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS OF THE INVENTION

Figure 1:
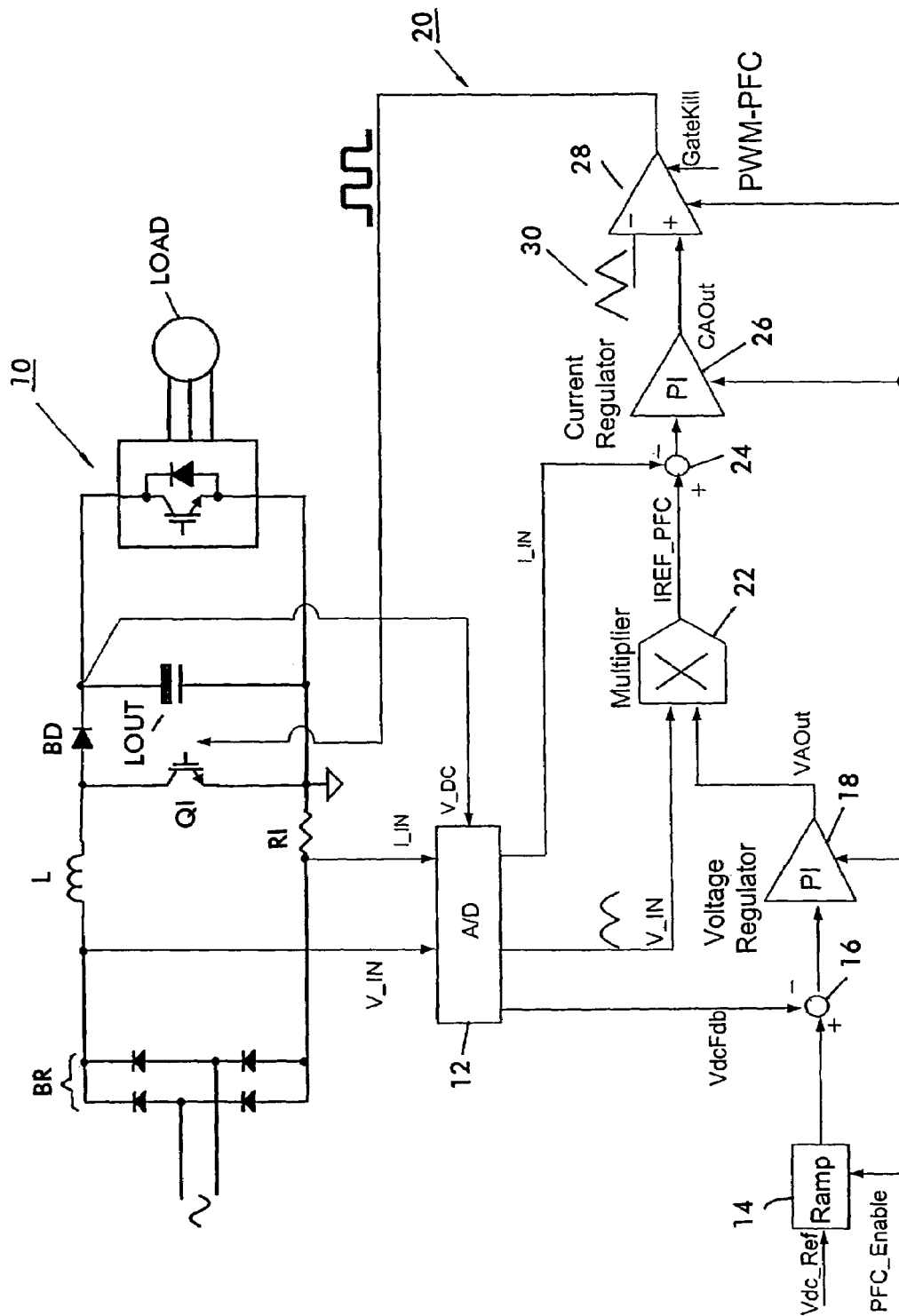
FIG. 1 is an illustration of a conventional power factor correction circuit.
Figure 1A:
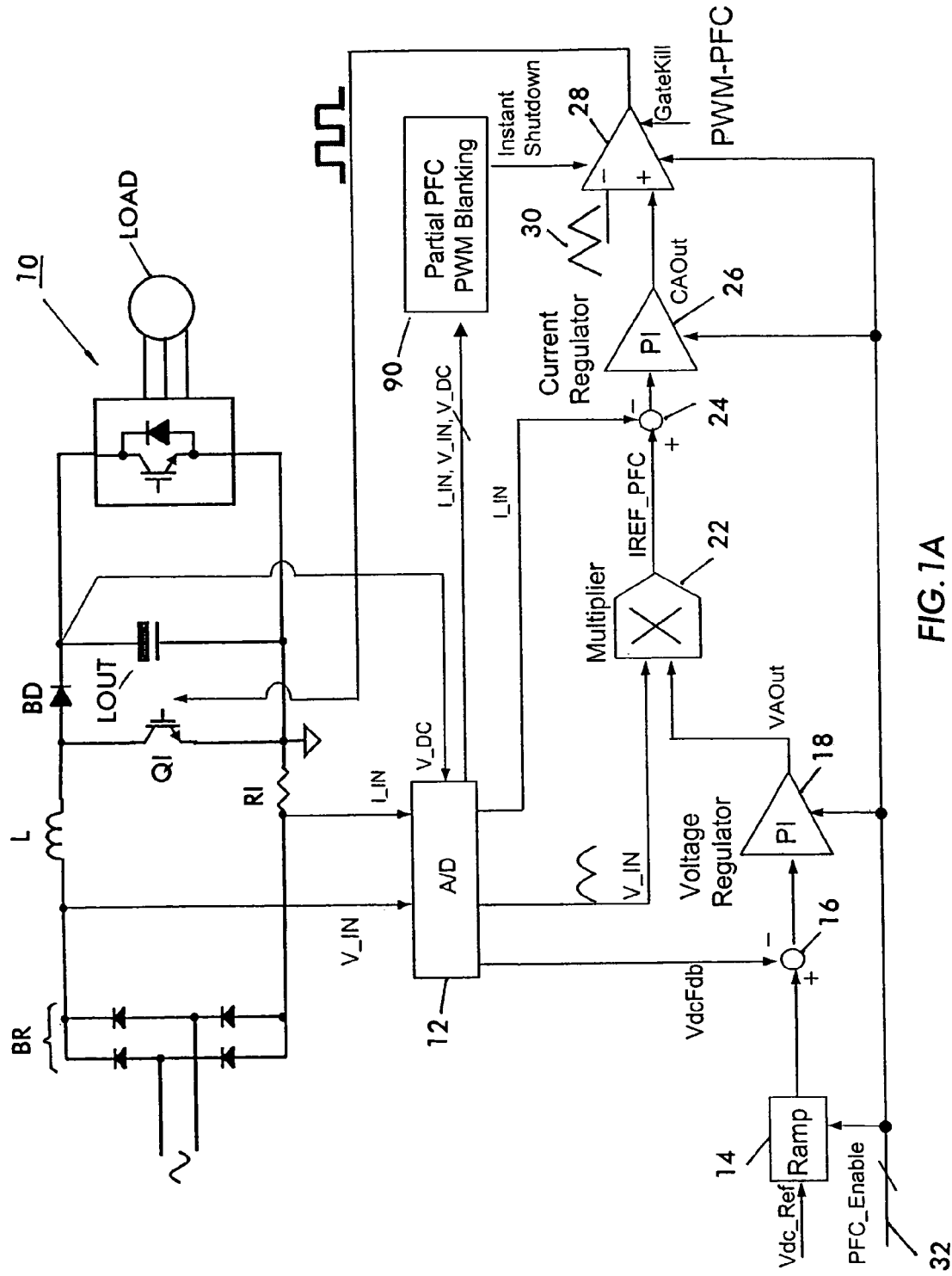
FIG. 1A is an illustration a power factor correction circuit utilizing partial mode power factor correction.
Figure 2:
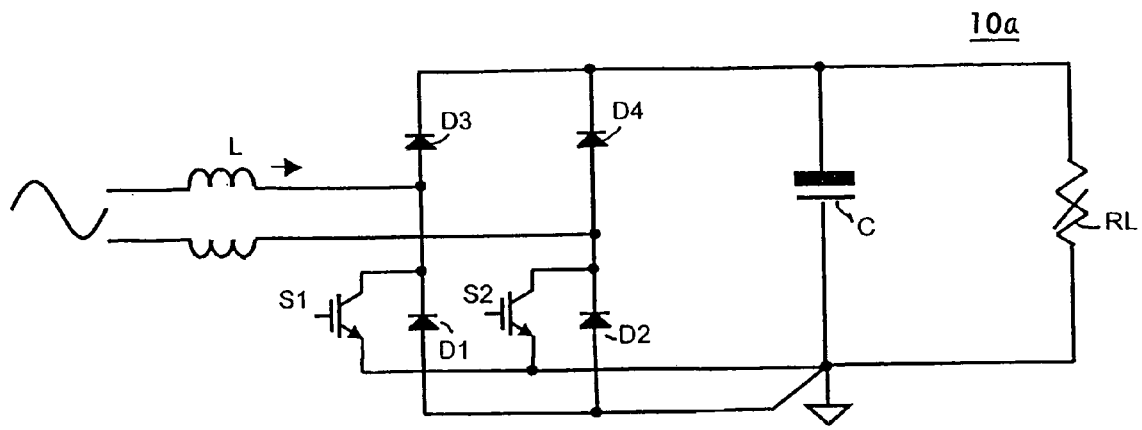
FIG. 2 is an illustration of a bridgeless boost rectifier.

It is noted that while the PFC circuit 10 illustrated in FIG. 1 illustrates a conventional boost PFC circuit, the control concept and implementation of the present invention are similarly applicable to a bridgeless PFC circuit 10a, such as that illustrated in FIG. 2, for example. More detailed information regarding power factor correction and digital control thereof in bridgeless PFC circuits can be found in U.S. patent application Ser. No. 11/267,516 of Yong Li entitled DIGITAL CONTROL OF BRIDGELESS POWER FACTOR CORRECTION CIRCUIT filed on Nov. 4, 2005 and incorporated by reference herein above.

Figure 3:
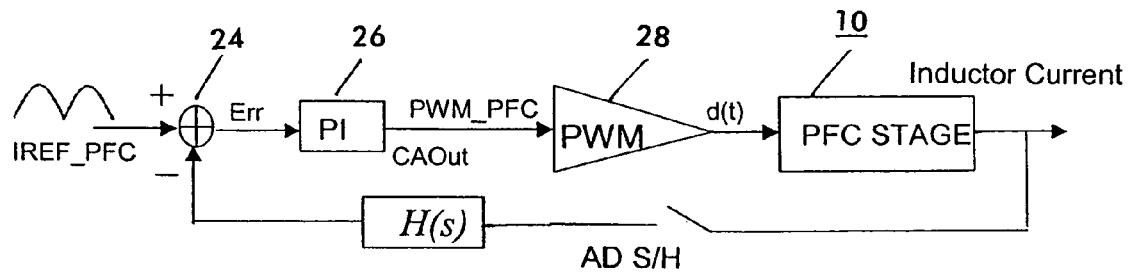
FIG. 3 is a simplified illustration of the current regulation loop of the circuit of FIG. 1.
Figure 4:
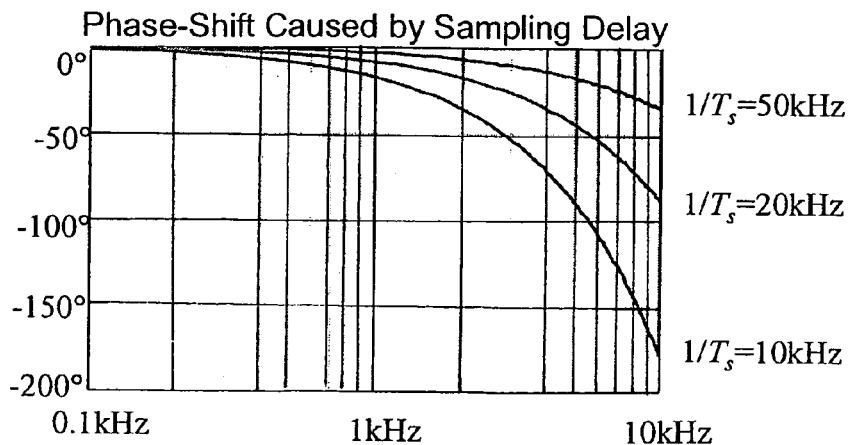
FIG. 4 is a chart illustrating the effect of sampling delays on phase shift in the circuit of FIG. 1.

As an initial matter, the PFC current regulation loop as illustrated in FIG. 3, for example will be described, and particularly, how the current regulation is accomplished by PI controller 26. The final output of the PFC current regulation loop is the duty cycle command PWM-PFC. Utilizing PWM switching-cycle average and modeling of the PFC circuit, the instantaneous switch-on duty cycle d(t) may be expressed as follows:

$$d(t) = 1 - \frac{V_{in}(t)}{V_{dc}(t)} + \frac{L}{V_{dc}(t)} \cdot \frac{di_L(t)}{dt}, \quad \text{Eq. 1.2}$$

where $V_{in}(t)$ is the instantaneous AC input voltage, $V_{dc}(t)$ is the instantaneous DC bus voltage, $i_L(t)$ is the instantaneous inductor current, and L is the PFC inductance. $V_{in}(t)$ is given by:

$$V_{in}(t) = V_{in\_pk} \cdot \sin(2\pi f \cdot t), \quad \text{Eq. 1.3}$$

where $V_{in\_pk}$ is the peak of AC input voltage and f is the line frequency (typically 50 Hz/60 Hz). Assuming the PFC current regulator loop is perfect, the inductor current $i_L(t)$ exactly follows the sinusoidal AC input voltage, and can be expressed as $$i_L(t) = i_{L\_pk} \cdot \sin(2\pi f \cdot t), \quad \text{Eq. 1.4}$$

where $i_{L\_pk}$ is the peak of the inductor current. The fist term of Eq. 1.2, $[1-V_{in}(t)/V_{dc}(t)]$ represents "quasi" steady-state information, which is in the reverse sinusoidal shape; the second term, $L/V_{dc}(t) \cdot di_L(t)/dt$, represents a small dynamic change around the "quasi" steady state. Normally, the first term is dominant in amplitude and the second term is small, yet important in providing the desired current regulation loop.

Figure 6:
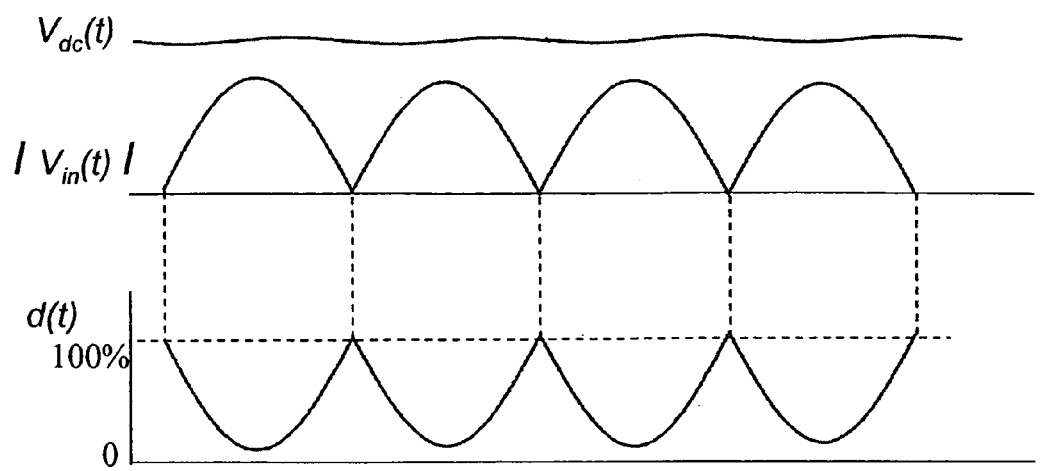
FIG. 6 is a chart illustrating the dynamic range of the rectified AC input voltage in the circuit of FIG. 1.

FIG. 6 illustrates a plot of the duty cycle d(t) waveform against the half-wave line voltage waveform $V_{in}(t)$. As illustrated, d(t) has a reversed sinusoidal shape changing in the range of 0 to 100%. When $V_{in}(t)=0$, d(t) should be the maximum (close to 100%) and when $V_{in}(t)$ reaches its peak, d(t) decreases to its minimum. Depending on the ratio of $V_{in\_pk}$ over the DC bus voltage, this minimum value of d(t) can be close to zero.

In order to correspond to the duty cycle d(t), the duty cycle command PWM-PFC should be:

$$PWM\_PFC = \left[1 - \frac{V_{in\_pk} \cdot \sin(2\pi f \cdot t)}{V_{dc}(t)} + \frac{L}{V_{dc}(t)} \cdot \frac{di_L(t)}{dt}\right] \cdot V_m, \quad \text{Eq. 1.5}$$

where $V_m$ is the peak value of the PWM carrier.

In a conventional digital PFC control circuit, for example, as illustrated in simplified form in FIG. 3, current control is performed entirely by a controller, for example, PI controller 26. The PI controller output CAOut is equal to the PWM-PFC. Therefore, the PI controller 26 has to handle a large dynamic change in every half line cycle (typically 10 ms in 50 Hz line and 8.3 ms in 60 Hz line) with the value changing between 100% and close to 0%. Thus, in the conventional approach, it is virtually impossible to control current with a sinusoidal waveform, particularly when using a digital control circuit with a relatively low A/D sampling rate, in the range of 20 kHz, for example.

Figure 7:
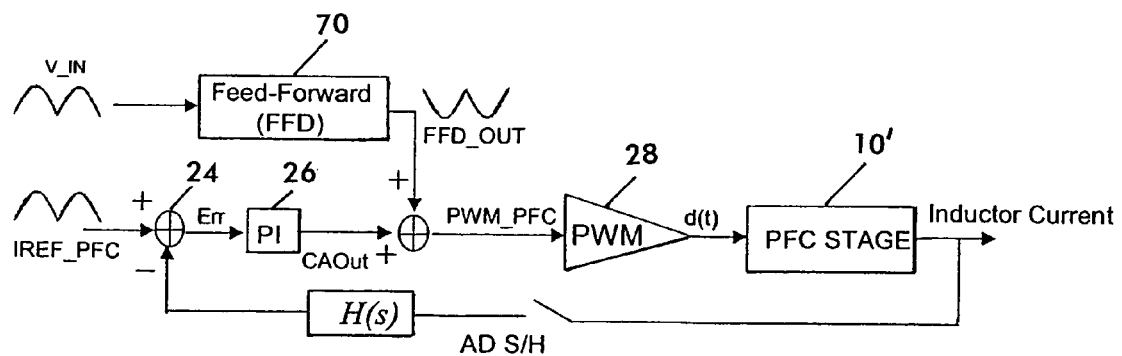
FIG. 7 illustrates a simplified current regulation loop in accordance with an embodiment of the present invention.
Figure 8:
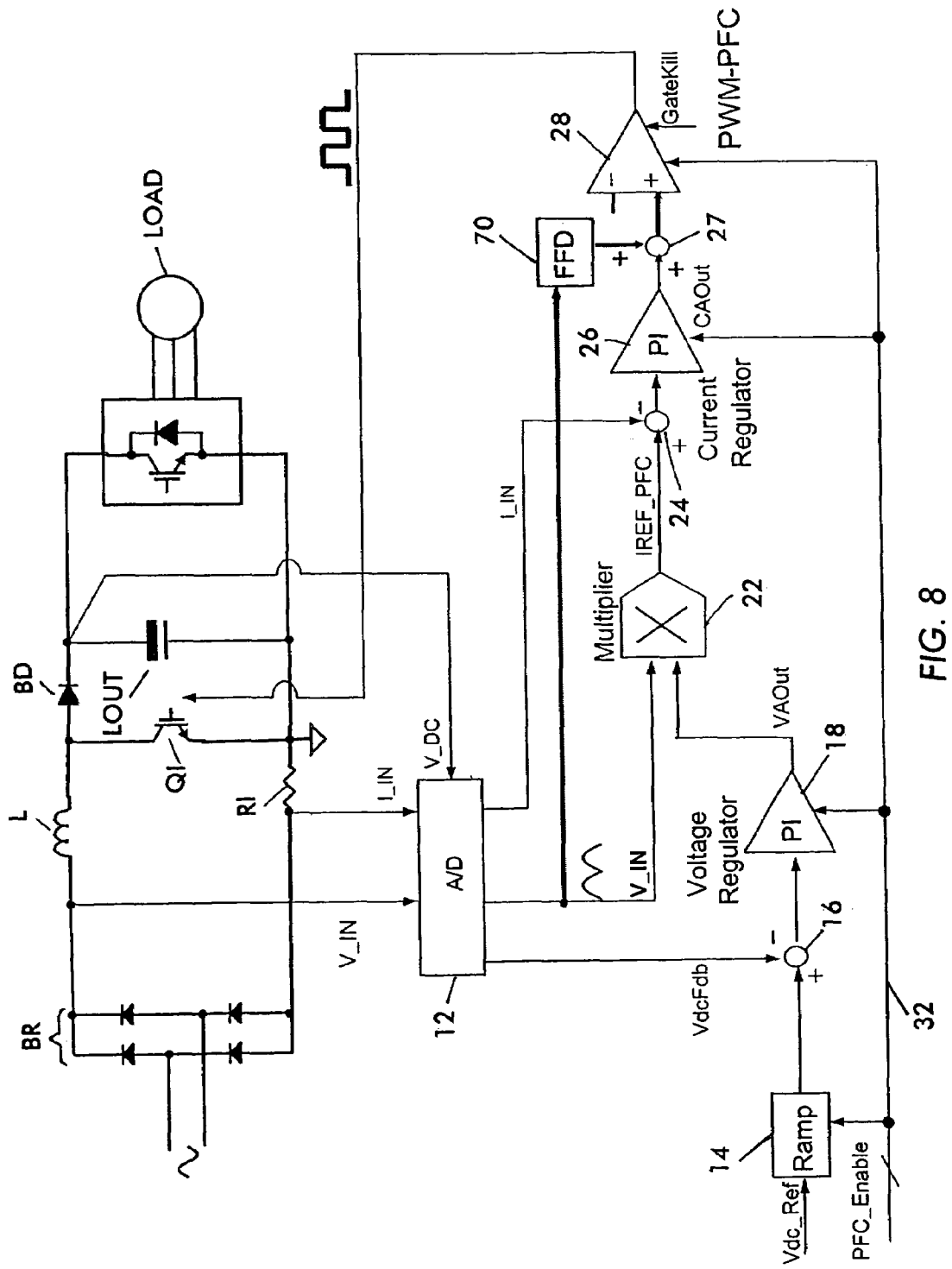
FIG. 8 illustrates a power factor correction circuit utilizing the current regulation loop of FIG. 7 in accordance with an embodiment of the present invention.

FIG. 7 illustrates a simplified schematic of a current regulation loop structure in a digital PFC control circuit according to an embodiment of the present invention. FIG. 8 shows a PFC circuit 10' with a digital control circuit 20' in accordance with an embodiment of the present invention that utilizes the current loop structure of FIG. 7.

As can be seen in FIG. 7, the current regulation loop structure in the digital PFC control circuit of the present invention includes a feed-forward loop device 70 which is provided with the rectified AC input voltage. The circuit of FIG. 7 is similar to that described above with reference to FIG. 3 and common elements are labeled using common reference numerals. Similarly, the circuit of FIG. 8 is similar to that of FIG. 1 and common elements are referred to using common reference numerals. While FIG. 8 illustrates a conventional boost PFC circuit, the invention of the present application is equally applicable to bridgeless PFC circuit topology. In this case, the feed forward loop is similarly provided with a half sinusoidal input AC voltage signal. Alternatively, the feed-forward loop device 70 may similarly be used in conjunction with the partial mode PFC circuit described above, as illustrated in FIG. 8A with equal utility.

Figure 8A:
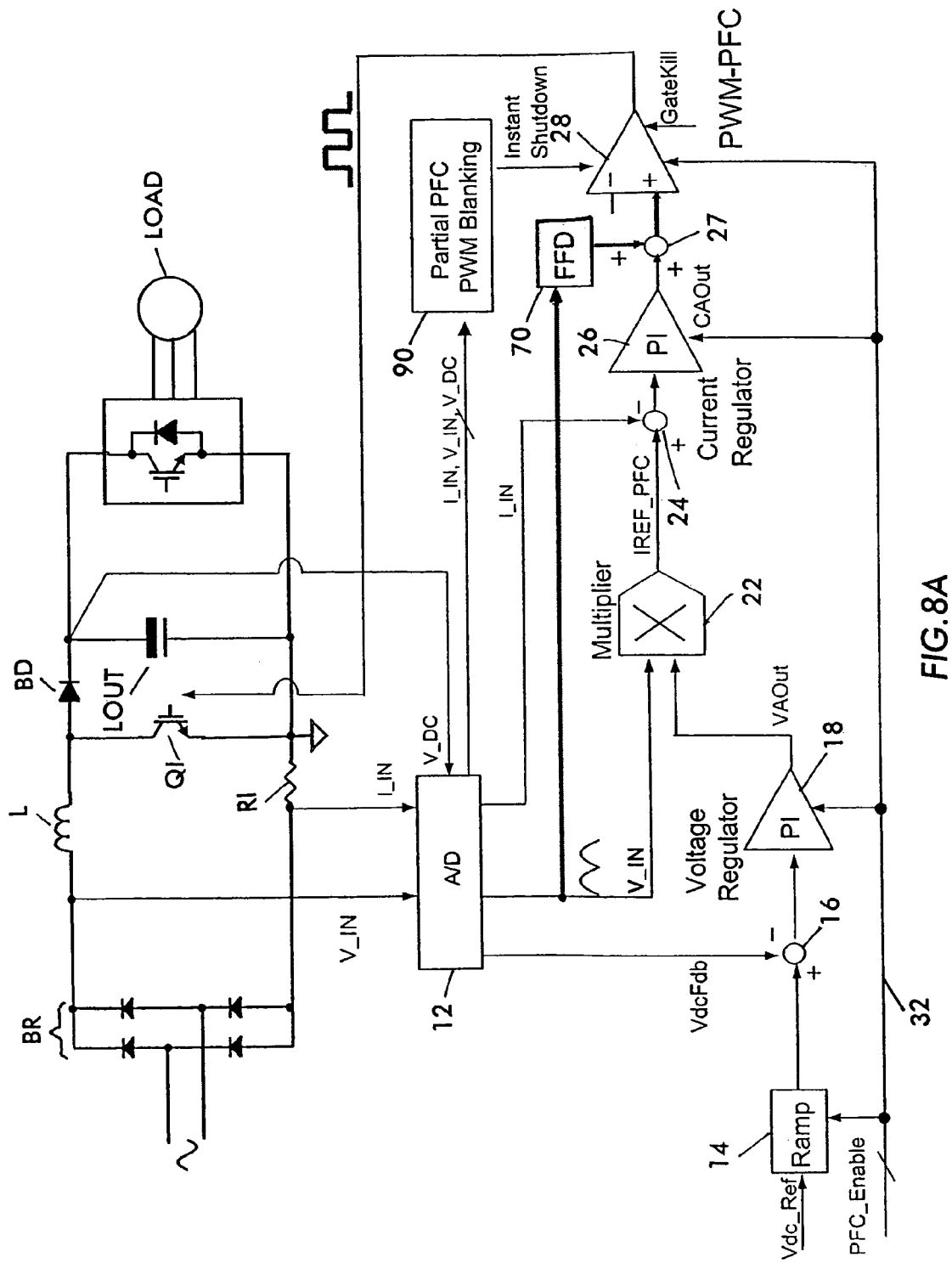
FIG. 8A illustrates a power factor correction circuit utilizing the current regulation loop of FIG. 7 in accordance with another embodiment of the present application.

As can be seen in FIGS. 7, 8 and 8A, the duty cycle command PWM_PFC is no longer provided solely by the PI controller 26, but instead is provided by the PI controller and the feed-forward loop device (FFD) 70 via adder 27, such that PWM-PFC=CAOut+FFD_OUT, where CA Out is the output of the PI controller 26 and FFD_OUT is the output of the feed-forward loop device 70.

The signal FFD_OUT is based on instant AC input voltage information and is represented by:

$$FFD\_OUT = \left[1 - \frac{V_{in}(t)}{V_{dc}(t)}\right] \cdot V_m \cdot K\_FFD, \quad \text{Eq. 1.6}$$

where K_FFD is a gain for the feed-forward loop device 70, which can be adjusted in the range between approximately 0 and 2.

Figure 9:
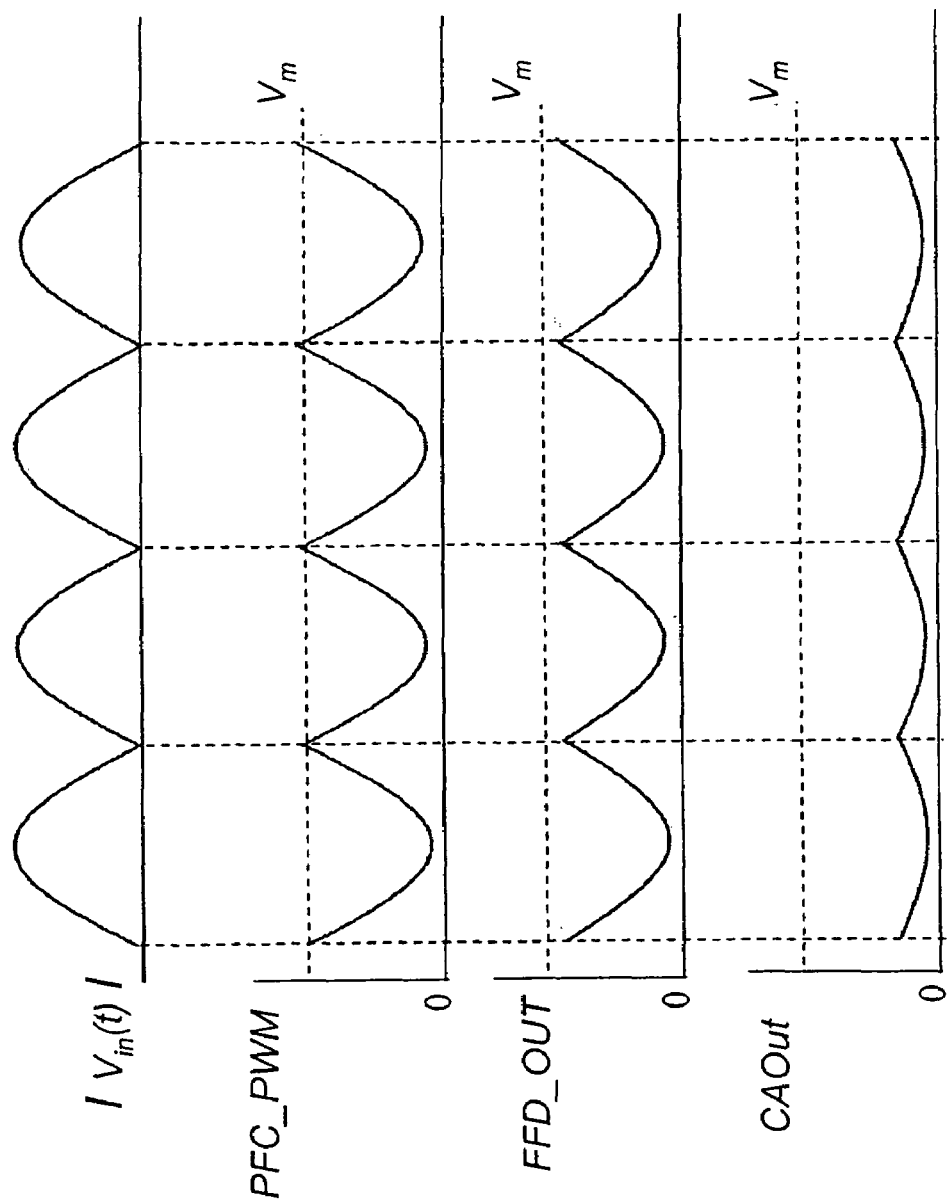
FIG. 9 is a chart illustrating the advantages in waveforms provided by the circuit of FIG. 8.

FIG. 9 illustrates that the feed-forward loop device 70 output, FFD_OUT, provides sinusoidal shape information for controlling the current, or the "quasi" steady-state operational point for the PI controller 26. Thus, the current loop remains similar to that described above with reference to FIG. 3, however, instead of handling large dynamics, the PI regulates a small dynamic around the "quasi" steady state operational point. As a result, output CAOut, of the PI controller 26 has a much smaller range of change as a result. Thus, the inductor current can be controlled to closely track the sinusoidal reference, without requiring high bandwidth or loop gain by the current regulator.

In designing the feed forward control device, there are certain criteria to be kept in mind, especially using a low A/D sampling rate. The first important criteria is the PI gain. The PI controller behavior may be expressed as:

$$PI(s) = \frac{CAOut}{Err} = Kp + \frac{Ki}{s}, \qquad \text{Eq. 1.7}$$

where Kp is the proportional gain and Ki is the integrator gain. After the feed forward signal, FFD_OUT, is added to the control loop, the PI gain is preferably substantially reduced.

The second criteria to keep in mind is the feed-forward gain K_FFD. The optimal value for the feed forward gain K_FFD is between 0.7-0.9 and 1.1-1.5. However, the K_FFD is preferably not set equal to 1. When K_FFD=0, there is no feed forward and the control circuit 20' works in accordance with the conventional control circuit 20 discussed above.

Further, there may be some concerns regarding the implementation of the feed forward control device. As noted above, the instant DC bus voltage $V_{dc}(t)$ is used to calculate FFD_OUT. Given that the voltage regulator, (PI controller 24) typically has a very low bandwidth and the DC bus voltage may be controlled to be equal to the reference, Vdc_Ref, the equation discussed above may be simplified as follows:

$$\text{FFD\_OUT} = \left[1 - \frac{V_{in}(t)}{\text{Vdc\_ref}}\right] \cdot V_m \cdot \text{K\_FFD} \qquad \text{Eq. 1.8}$$

This simplified equation will simplify feed-forward loop design in applications where a variable DC bus voltage is required, such as in air conditioner motor drives, for example. If the DC bus remains constant in a particular application, and there is no change in the reference Vdc_Ref, further simplification is possible as follows:

$$FFD\_OUT = K_1 - K_2 \cdot V_{in}(t), \qquad \text{Eq. 1.9}$$

where $$K_1 = V_m \cdot K\_FFD, \text{ and}$$

$$K_2 = V_m \cdot K\_FFD / Vdc\_ref.$$

As can be seen, both $K_1$ and $K_2$ are constant parameters, and thus, the computation required is significantly reduced.

Figure 5A:
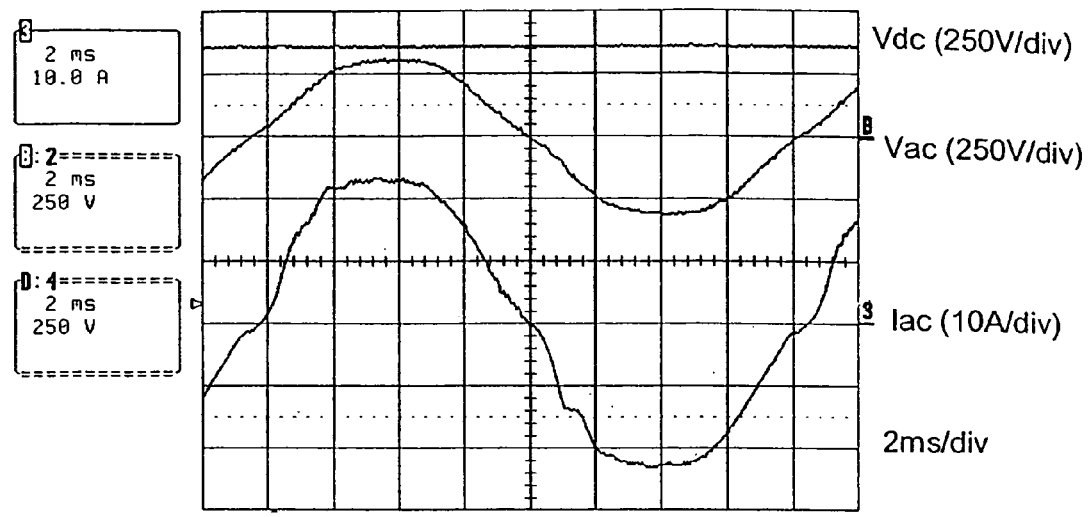
FIG. 5A is a chart illustrating waveforms of the circuit of FIG. 1 under heavy load conditions.
Figure 5B:
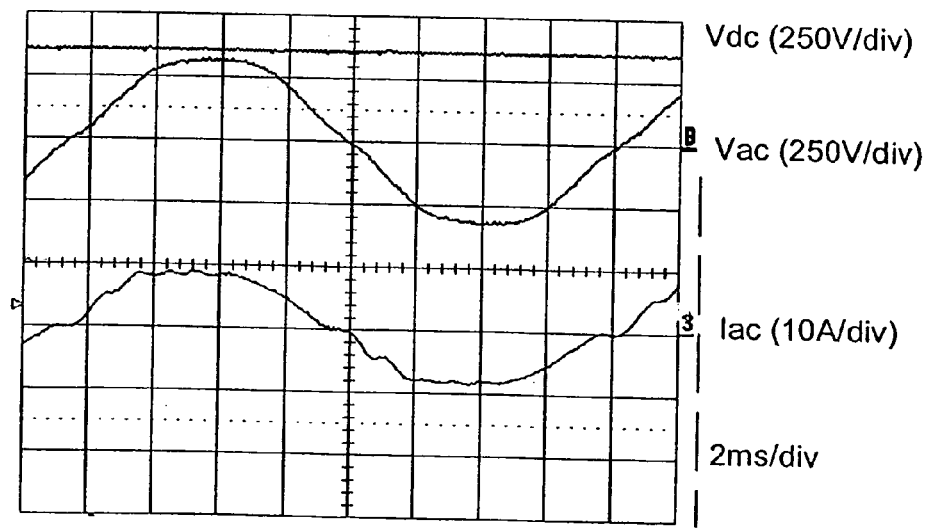
FIG. 5B is a chart illustrating waveforms of the circuit of FIG. 1 under light load conditions.
Figure 5C:
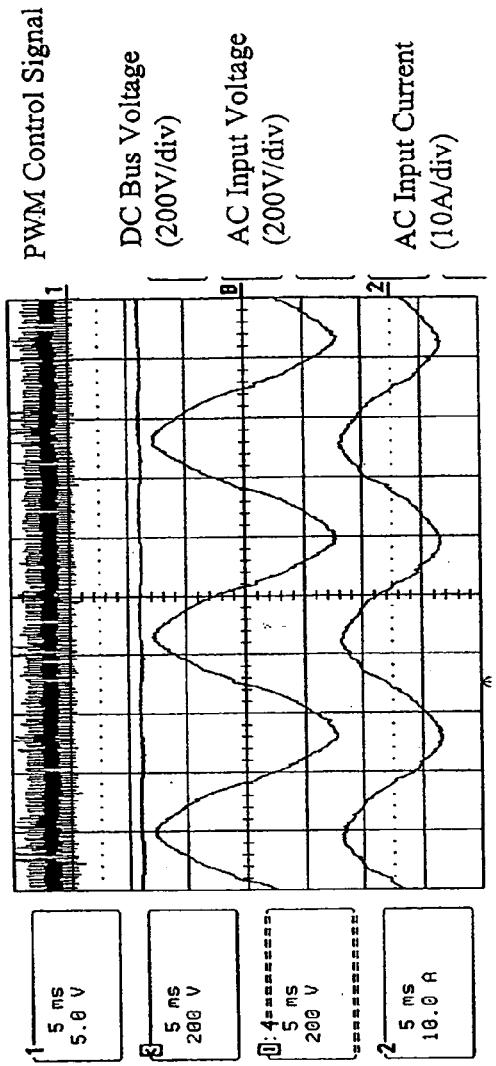
FIG. 5C is a chart illustrating waveforms of the circuit of FIG. 1A and the advantages provided thereby.
Figure 5C:
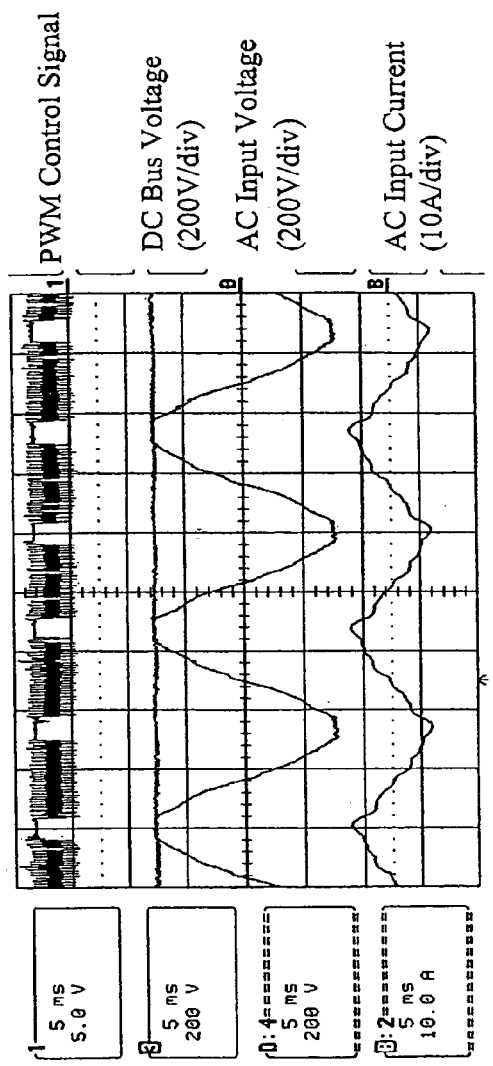
Figure 5E:
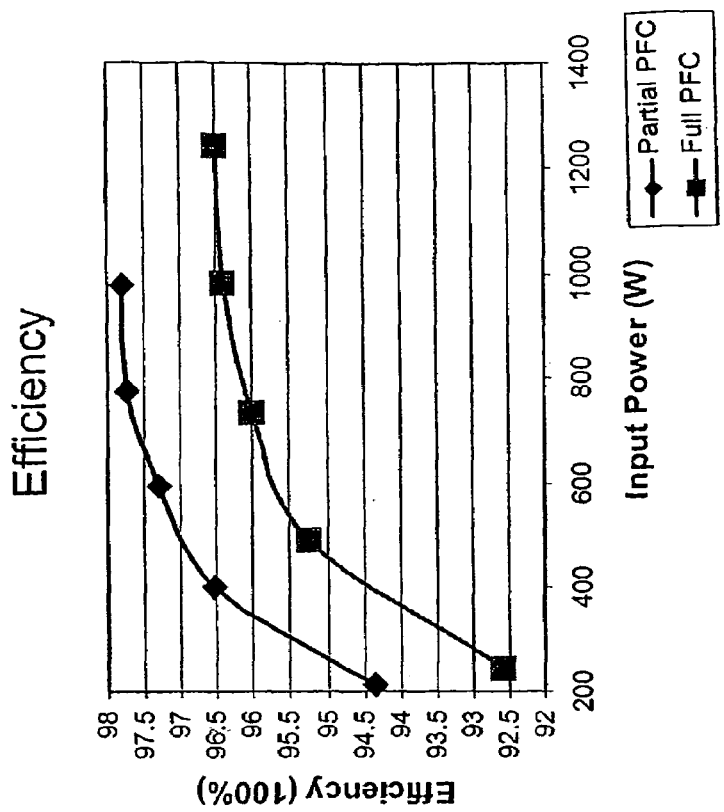
FIG. 5E is a chart illustrating the advantages in power factor provided by the circuit of FIG. 1A.
Figure 5D:
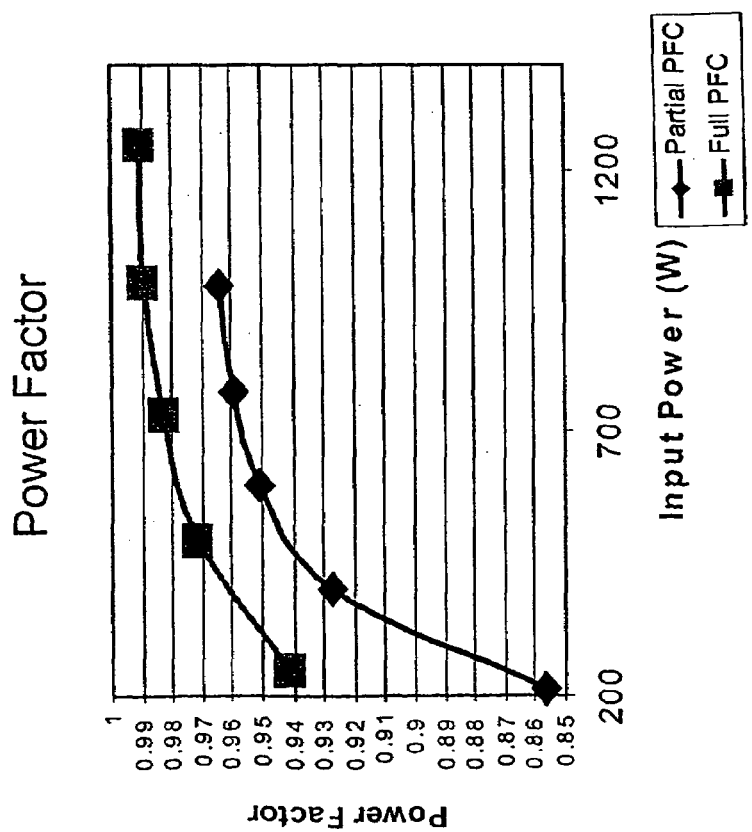
FIG. 5D is a chart illustrating the advantages in circuit efficiency provided by the circuit of FIG. 1A.
Figure 5F:
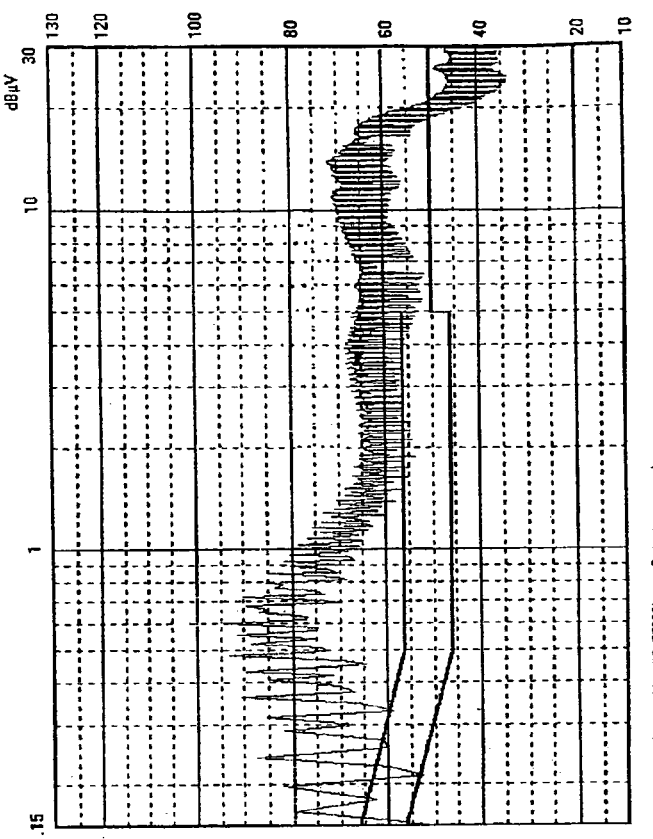
FIG. 5F illustrates the advantages provided by the circuit of FIG. 1A with regard to EMI distortion.
Figure 5F:
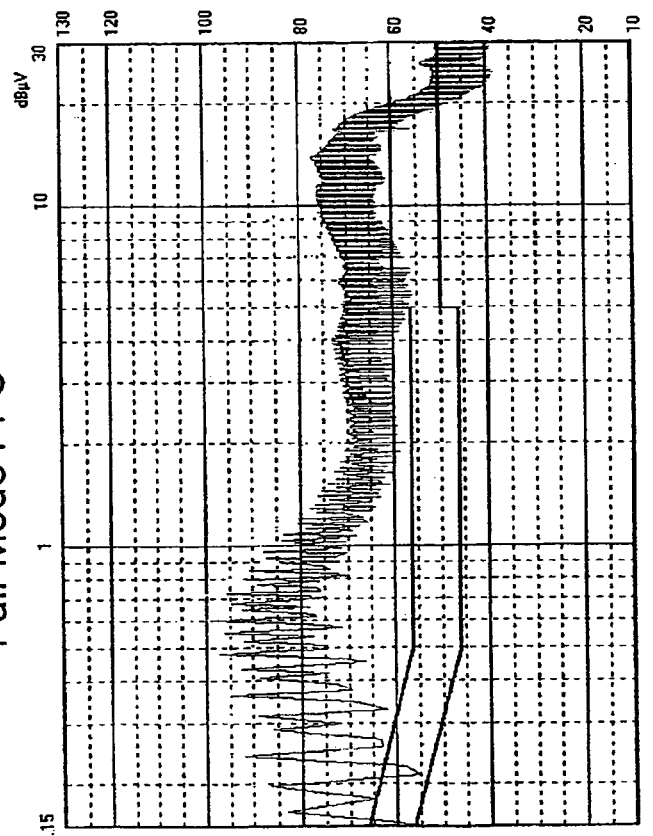
Figure 5G:
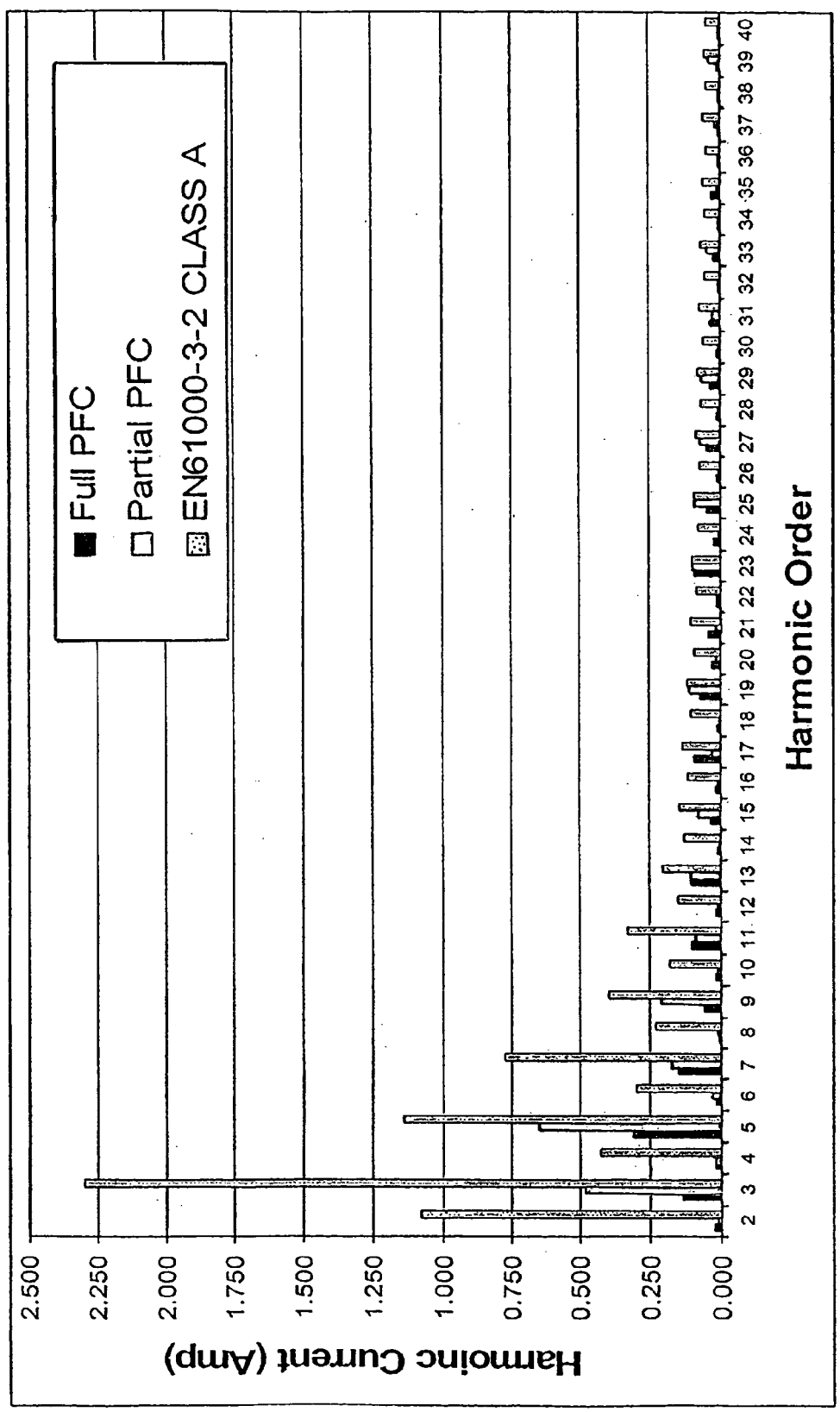
FIG. 5G illustrates the advantages provided by the circuit of FIG. 1A with reference to harmonic standards.
Figure 10A:
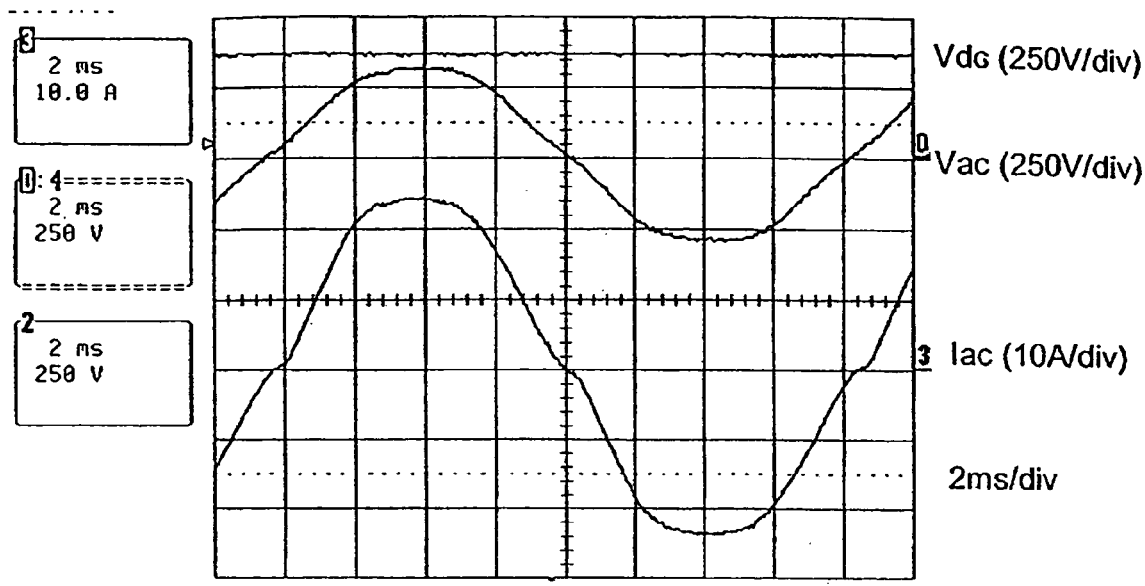
FIG. 10A is a chart illustrating the waveforms of the circuit of FIG. 8 under heavy load conditions.
Figure 10B:
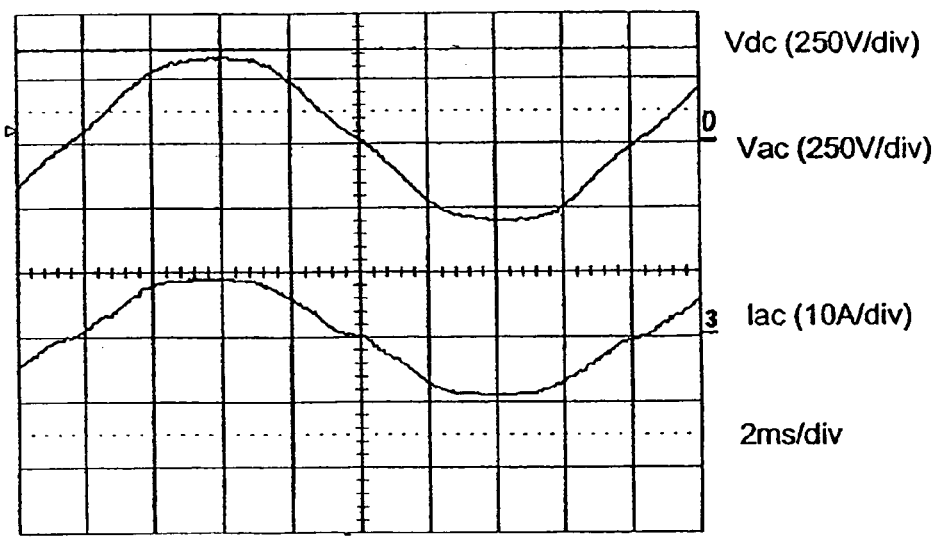
FIG. 10B is a chart illustrating the waveforms of the circuit of FIG. 8 under light load conditions.

FIGS. 10A and 10B, respectively, illustrate test waveforms of a single phase PFC circuit utilizing the feed-forward control device 70 described above under heavy load conditions (FIG. 10A) and light load conditions (10 B). The test circuit and A/D sampling rate (20 kHz) are the same as those utilized in preparing FIGS. 5A and 5B discussed above. As illustrated, in FIGS. 10A and 10B the use of the feed forward control device 70 substantially improves the current waveforms when compared to those of FIGS. 5A and 5B.

Thus, the feed forward control device 70 of the present application improves the performance of the PFC circuit in accordance with the present application. However, additional improvements in accordance with the present invention provide even better results.

In another embodiment of the present invention a "vector rotator" may be provided to improve performance of a PFC circuit. The vector rotator was originally developed for three phase motor driven applications to provide clean sinusoidal reference signals for single phase PFC control circuits regardless of the actual shape or distortion of the AC input voltage. In addition to controlling the current to provide a clean sinusoidal waveform, the PFC control circuit in accordance with this embodiment makes the PFC control circuit insensitive to AC voltage variation.

Generally, PFC control requires a sinusoidal reference for the current regulator (for example, PI controller 26). Thus, the sinusoidal reference should be in phase with the AC input voltage and usually is available using the rectified half wave input voltage (V_IN) and/or via A/D conversion (V_IN') as illustrated in FIGS. 1 and 8, for example, discussed above. However, under real-world conditions, there are non-negligible line impedance distortions and/or distortions in the AC voltage sources (which may be 220V or 230V, for example) from the utility line which result in current waveforms thereof having distortions. For example, as illustrated in FIGS. 10A and 10B, which illustrate test results from the circuit illustrated in FIG. 8, even where the feed forward control signal FFD_OUT is used for current regulation, the inductor current is not a complete sinusoidal wave. In particular, the waveform of the current flattens out at the top. The flat top is the result of a flat top in the AC input voltage, which is due to heavy line impedance. The flat top results in low-order harmonic current flow, primarily fifth harmonic. While this low order harmonic current typically does not affect compliance with the harmonic standard discussed above, it is undesirable in certain applications. Where a complete sinusoidal current is required, a clean sinusoidal reference is preferred.

Conventionally, "zero-crossing" detection is used to determine the phase angle θ of the input AC voltage. Zero crossing detection may be implemented using hardware or using A/D results of the instantaneous AC input voltage. Further, it may be combined with a phase-locked loop (PLL) in order to handle the situation in which AC line frequency varies between 50 Hz and 60 Hz or when there is noise. A look-up table is typically provided that stores the instantaneous sinusoidal value against a changing phase angle. Alternatively, real time computation may be used to determine the instantaneous sinusoidal values. This conventional approach, however, requires extra memory space and/or high computational power in the IC.

A power factor correction circuit including a digital control circuit in accordance with an embodiment of the present invention utilizes a vector rotator in place of the look-up table and/or real time computation to produce the clean sinusoidal reference for the digital PFC control circuit.

The vector rotator block was originally developed and used for three phase motor applications and is generally implemented as a stand alone IC module for motion control. The PFC control circuit, in accordance with an embodiment of the present invention utilizes the vector rotator for a PFC application without the use of additional hardware or firmware sources.

Figure 14:
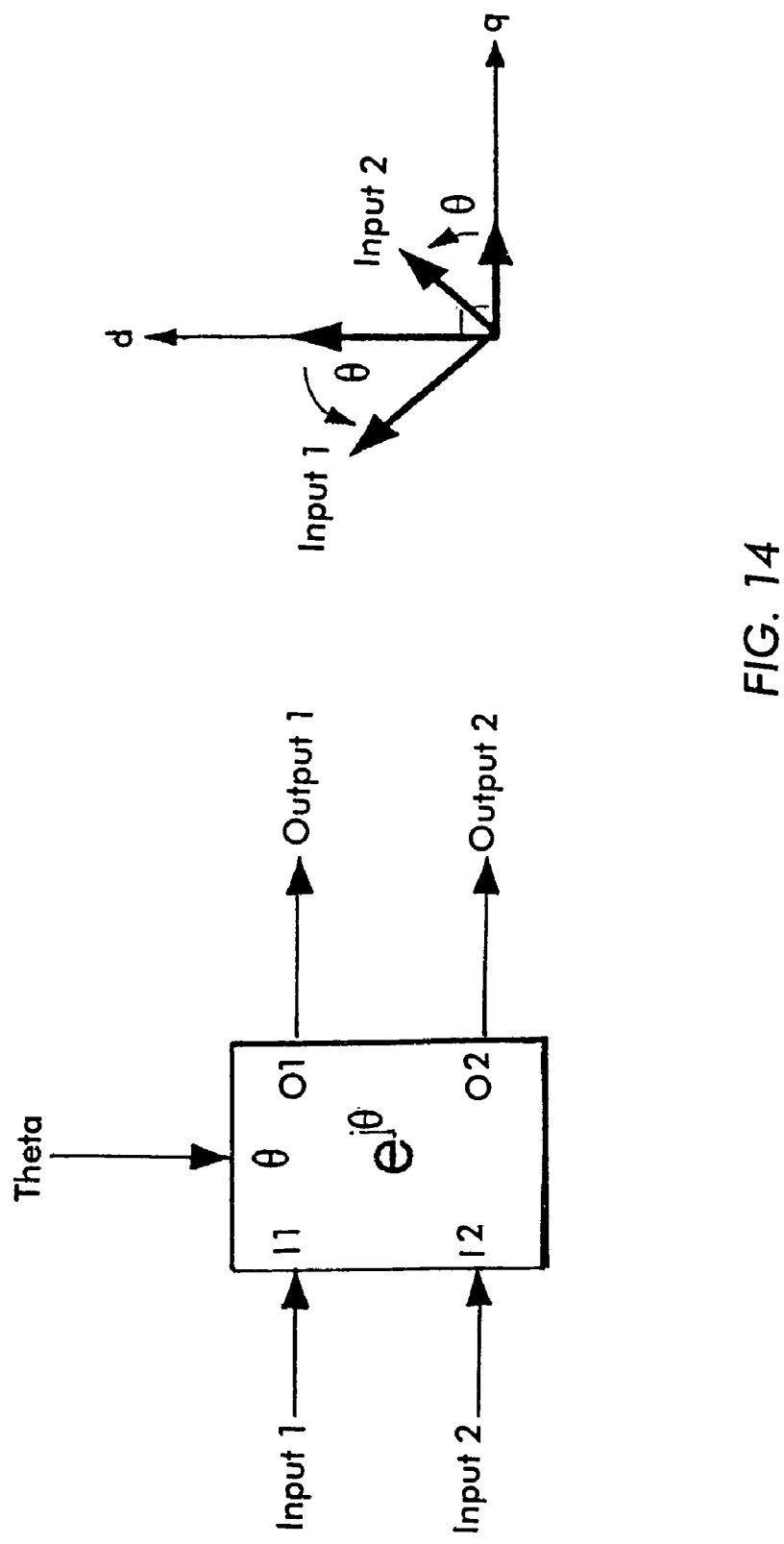
FIG. 14 is an illustration of a vector rotator is accordance with an embodiment of the present application.

The vector rotator is typically represented as illustrated in FIG. 14. The vector rotator module illustrated in FIG. 14 implements the following function:

$$\begin{bmatrix} Output1 \\ Output2 \end{bmatrix} = \begin{bmatrix} \cos\theta & -\sin\theta \\ \sin\theta & \cos\theta \end{bmatrix} \cdot \begin{bmatrix} Input1 \\ Input2 \end{bmatrix}, \quad \text{Eq. 1.10}$$

The following calculations are performed in the discrete domain:

$$x\text{out} = x\text{in}*\cos(\text{angle}) + y\text{in}*\sin(\text{angle})$$

$$y\text{out} = -x\text{in}*\sin(\text{angle}) + y\text{in}*\cos(\text{angle}).$$

The inputs D, Q (Input1 and Input 2) preferably have a data range of +/−$2^{12}$, The angle input is preferably a 14-bit rotation angle with values 0-16383 representing angles from 0-359.978.

The vector rotator originally was used to transfer the rotating frame d, q components to stationary α, β components for motion control such that:

$$\begin{bmatrix} I_a \\ I_b \end{bmatrix} = \begin{bmatrix} \cos\theta & -\sin\theta \\ \sin\theta & \cos\theta \end{bmatrix} \cdot \begin{bmatrix} I_d \\ I_q \end{bmatrix}, \quad \text{Eq. 1.11}$$

where $I_\alpha$, $I_\beta$ currents normally are time varying in light of the transient process. However, as noted above, in PFC control after obtaining phase angle θ information using the zero-crossing detection and/or a PLL, Input 1 may be set as a constant K, and Input 2 may be set as zero, or vice versa. Thus, we can determine Output 1 and Output 2 as sin θ and thus:

$$\text{if } \begin{bmatrix} Input1 \\ Input2 \end{bmatrix} = \begin{bmatrix} K \\ 0 \end{bmatrix},$$

$$\text{then } \begin{bmatrix} Output1 \\ Output2 \end{bmatrix} = \begin{bmatrix} K \cdot \cos\theta \\ K \cdot \sin\theta \end{bmatrix} \quad \text{Eq. 1.12}$$

As a result, it is clear that Output 2 will produce a clean sinusoidal reference that is in phase with the AC input voltage, regardless of the actual shape of the AC input voltage.

Further, since K is a constant, in order to produce the clean sinusoidal reference, only phase information of the AC input voltage is needed. The actual amplitude information of the AC input voltage is unnecessary, and thus, the PFC control loop is insensitive to AC input voltage variation which is important for universal line operations. For most of today's analog PFC control IC's, in order to make the control loop insensitive to the AC input voltage variation, extra circuits and components are required.

Figure 11:
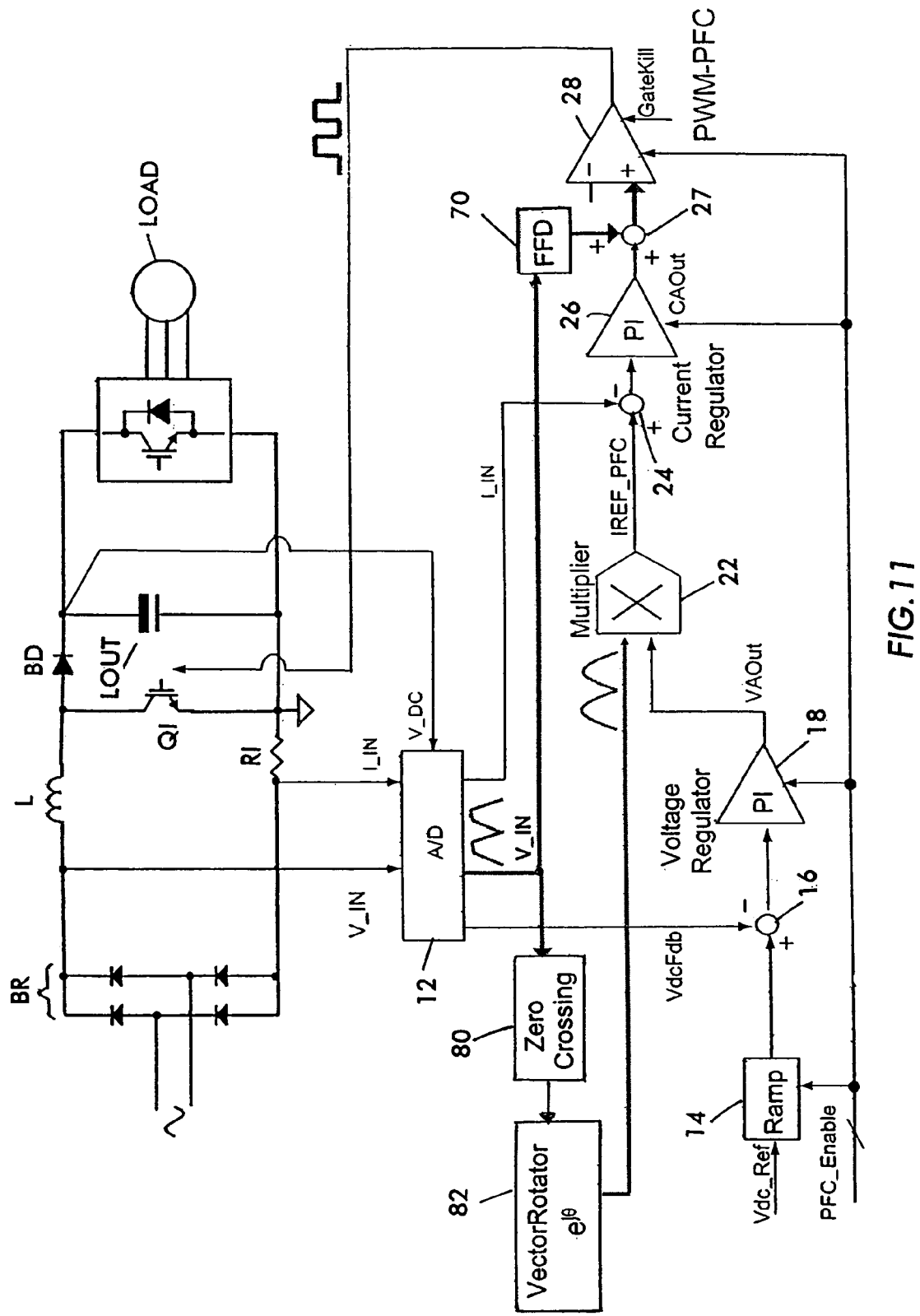
FIG. 11 illustrates a power factor correction circuit in accordance with another embodiment of the present invention.

FIG. 11 illustrates a power factor correction circuit including a boost rectifier 10″ and a control circuit 20″ that includes zero crossing detector 80 and vector rotator 82 that are used to provide the sinusoidal reference signal to the current regulator via the multiplier 24, for example.

As can be seen in FIG. 11, the PFC circuit may also include the feed forward loop device 70 discussed above. The digitized input voltage V_IN' is preferably provided to the zero crossing detector 80 which is used to determine phase angle θ of the input AC voltage. This information is provided to the vector rotator 82, as described above. The output of the vector rotator 82 can then provide a near perfect sinusoidal reference signal that is in phase with the input AC voltage. This sinusoidal reference signal is provided to multiplier 22, for example, and utilized in the current regulation loop to ensure that the inductor current matches phase with the AC input voltage as described above.

Figure 11A:
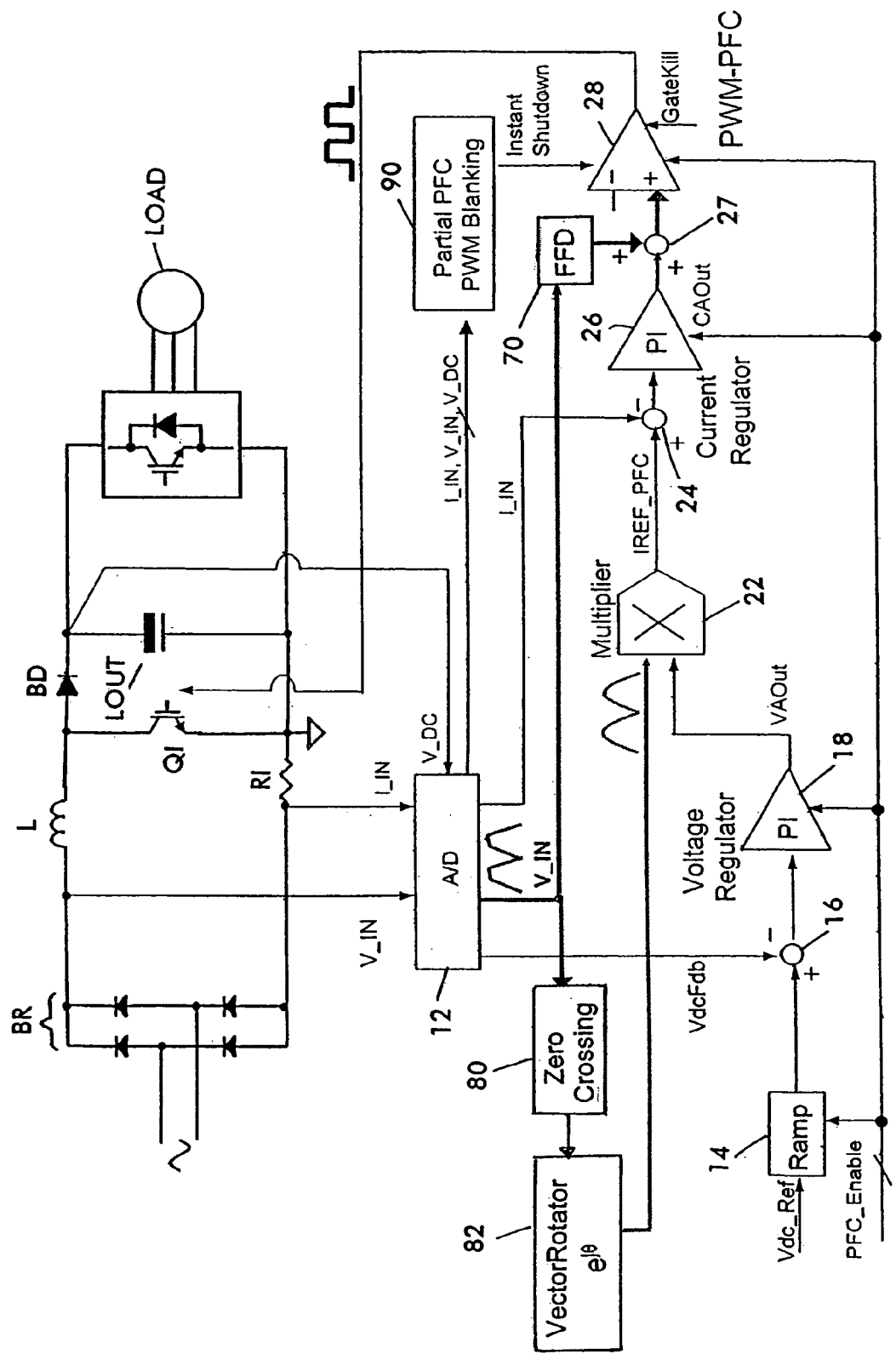
FIG. 11A is a schematic of a power factor correction circuit in accordance with another embodiment of the present invention.

Similarly, FIG. 11A illustrates a PFC circuit which includes the feed forward control device 70, zero crossing detector 80 and vector rotator 82 along with the Partial PFC module 90 utilized in partial mode PFC.

Figure 12A:
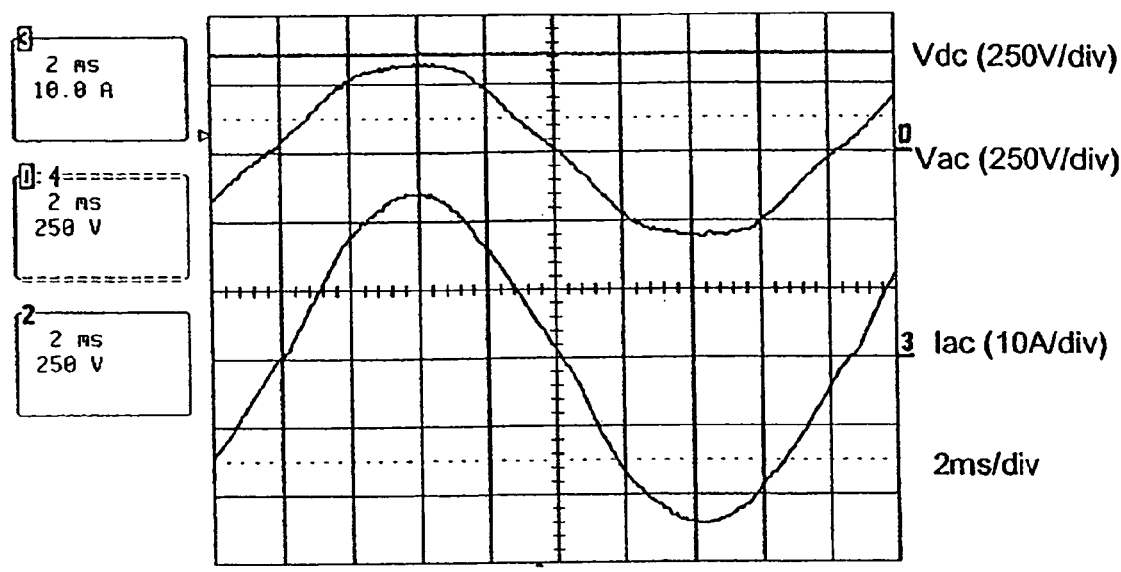
FIG. 12A is a chart illustrating the waveforms of the circuit of FIG. 11 under heavy load conditions.
Figure 12B:
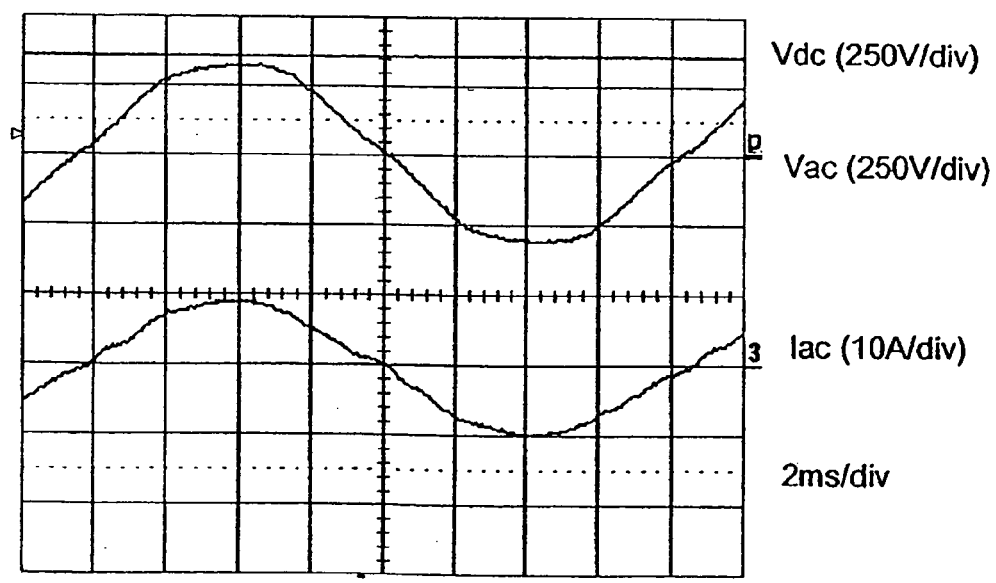
FIG. 12B is a chart illustrating the waveforms of the circuit of FIG. 11 under light load conditions.

FIGS. 12A and 12B illustrate experimental waveforms produced using 20 kHz A/D conversion in the circuit of FIG. 11. The waveforms of FIGS. 12A and 12B use the same test circuit and sampling rate used to generate the waveforms of FIGS. 5A and 5B and 10A and 10B. As can be seen in comparison to FIGS. 10A and 10B, the current waveform illustrated in FIGS. 12A and 12B are completely sinusoidal and are in fact even more sinusoidal than the AC supply input voltage which has a flat top due to heavy line impedance. Conventional PFC control circuits do not provide such a beneficial result. The circuit of FIG. 11A illustrates a circuit similar to that of FIG. 11 with the addition of the partial PFC controller 90. The circuit of FIG. 11A offers similar benefits with regard to the sinusoidal shape as that of FIG. 11.

Figure 13:
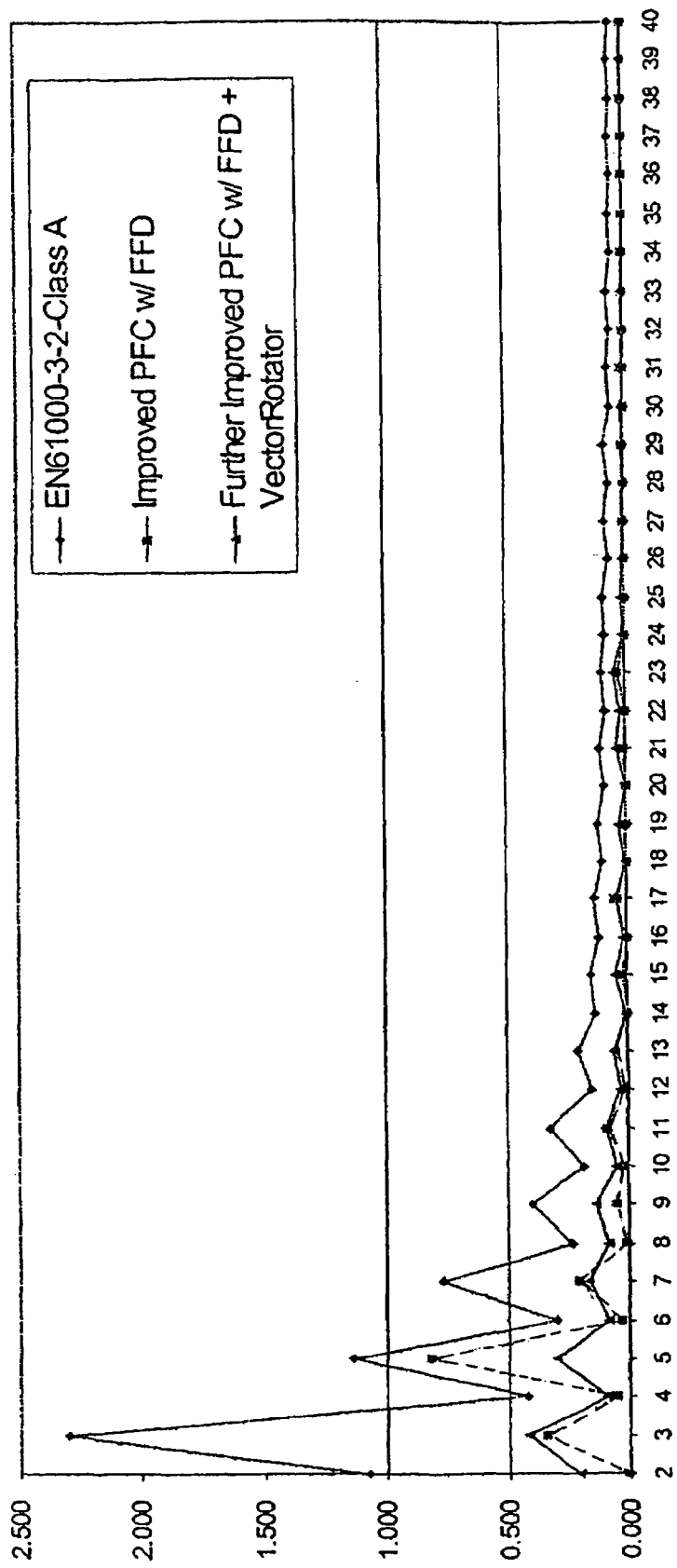
FIG. 13 is a chart illustrating the advantages of the circuits of FIGS. 8 and 11 with regard to harmonic standards.

FIG. 13 compares the measured harmonics of the circuit of FIG. 11 against EN61000-3-2 Class A under the maximum specified input current condition, 16 A in this case. The use of both the feed forward control loop 70 described above with reference to FIG. 8 satisfies the standard. However, as illustrated, at the $5^{th}$ harmonic, the AC input voltage has a significant fifth harmonic which is introduced into the current vector unless the vector rotator 82 is used as described above. If the fifth harmonic is introduced, the sinusoidal reference is distorted, however, zero crossing detector 80 and the vector rotator 82 are used, the sinusoidal reference remains clean.

Accordingly, it is clear that the embodiment of the PFC control circuit described herein provide substantially improved results. The feed forward control device 70 described above with reference to FIG. 8 substantially improves the sinusoidal shape of the current waveform. The additional use of the vector rotator 82 improves the waveform even further, providing a cleaner sinusoidal reference shape than even the AC input voltage.

Although the present invention has been described in relation to particular embodiments thereof, many other variations and modifications and other uses will become apparent to those skilled in the art. It is intended, therefore, that the present invention be limited not by the specific disclosure herein, but only by the appended claims.

What is claimed is:

1. A circuit for providing power factor correction including:
a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor,
further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the power factor correction switch, the control circuit further comprising:

a voltage regulator providing a regulated voltage signal based on a reference voltage and the DC bus voltage;

a multiplier operable to multiply the regulated voltage signal by the rectified AC input voltage to provide a current reference signal;

a current regulator receiving the current reference signal and the signal proportional to the inductor current, wherein the current regulator further comprises:

a difference device operable to subtract the signal proportional to the inductor current from the current reference signal, a PI controller adapted to receive the output of the difference device and provide a first control signal;

a feed forward device operable to receive the rectified AC input voltage and to provide a second control signal, wherein the second control signal has a smaller dynamic range than the AC input voltage;

an adder operable to add the first control signal to the second control signal to provide a PWM reference signal; and a pulse width modulated signal generator operable to provide the pulse width modulated signal to control the on time of the PFC circuit, wherein the pulse width modulated signal generator utilizes the PWM reference signal to generate the pulse width modulated signal.

2. The circuit of claim 1, wherein the feed forward loop device provides sinusoidal shape information of the input AC voltage, such that the pulse width modulated signal produced by the pulse width modulated signal generator drives the boost converter circuit to provide a substantially sinusoidal inductor current.

3. The circuit of claim 1, wherein the control circuit further comprises:

a zero crossing detector receiving the rectified AC voltage and providing an angle signal indicating the phase of the input AC voltage; and a vector rotator adapted to receive the angle signal and the rectified AC input voltage and to provide a clean sinusoidal reference signal in phase with the AC input voltage and provides the clean sinusoidal reference signal to the multiplier.

4. The circuit of claim 3, wherein the control circuit further comprises:

a partial PFC device that provides a blanking signal to the pulse width modulated signal generator to disable the pulse width modulated signal generator under predetermine conditions.

5. The circuit of claim 1, wherein the control circuit further comprises:

a partial PFC device that provides a blanking signal to the pulse width modulated signal generator to disable the pulse width modulated signal generator under predetermine conditions.

6. A circuit for providing power factor correction including a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor, further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the power factor correction switch, the control circuit further comprising:

a voltage regulator providing a regulated voltage signal based on a reference voltage and the DC bus voltage;

a zero crossing detector receiving the rectified AC voltage and providing an angle signal indicating a phase of the input AC voltage;

a vector rotator adapted to receive the angle signal and the rectified AC input voltage and to provide a clean sinusoidal reference signal in phase with the input AC voltage;

a multiplier operable to multiply the regulated voltage signal by the clean sinusoidal reference signal to provide a current reference signal;

a current regulator receiving the current reference and the signal proportional to the inductor current and providing a PWM reference signal, and a pulse width modulated signal generator operable to provide the pulse width modulated signal to control the on time of the PFC circuit, wherein the pulse width modulated signal generator utilizes the PWM reference signal to generate the pulse width modulated signal.

7. The circuit of claim 6, wherein the current regulator further comprises:

a difference device operable to subtract the signal proportional to the inductor current from the current reference signal, a PI controller adapted to receive the output of the difference device and provide a first control signal;

a feed forward device operable to receive the rectified AC input voltage and to provide a second control signal, wherein the second control signal has a smaller dynamic range than the rectified AC input voltage; and an adder operable to add the first control signal to the second control signal to provide the PWM reference signal.

8. The circuit of claim 7, wherein the feed forward loop device provides sinusoidal shape information of the input AC voltage, such that the pulse width modulated signal produced by the pulse width modulated signal generator drives the boost converter circuit to provide a substantially sinusoidal inductor current.

9. The circuit of claim 8, further comprising a partial PFC device operable to provide a blanking signal to the pulse width modulated signal generator to disable the pulse width modulated signal generator under predetermined conditions.

10. The circuit of claim 6, further comprising a partial PFC device operable to provide a blanking signal to the pulse width modulated signal generator to disable the pulse width modulated signal generator under predetermined conditions.

11. A circuit for providing power factor correction including a bridgeless boost converter circuit;

an input circuit for an AC line voltage;

a control circuit receiving the AC line voltage, the control circuit being operative to provide a pulse width modulated signal to control the on time of a PFC switch of the bridgeless boost converter circuit;

the control circuit comprising:

a scaling device operable to scale down the AC line voltage from bipolar to uni-polar form;

an analog to digital converter operable to convert the unipolar AC voltage into digital data;

a digital rectifier operable to process the digital data of the unipolar AC voltage to provide a rectified half-sinusoidal AC voltage signal that is proportional to and in phase with the input AC line voltage;

a voltage regulator providing a regulated voltage signal based on a reference voltage and the DC bus voltage;

a multiplier operable to multiply the regulated voltage signal by the rectified half-sinusoidal AC voltage signal to provide a current reference signal;

a current regulator receiving the current reference and the signal proportional to the inductor current, wherein the current regulator further comprises:

a difference device operable to subtract the signal proportional to the inductor current from the current reference signal, a PI controller adapted to receive the output of the difference device and to provide a first control signal;

a feed forward loop device operable to receive the rectified half-sinusoidal AC voltage signal and to provide a second control signal, wherein the second control signal has a smaller dynamic range than the AC line voltage;

an adder operable to add the first control signal to the second control signal to provide a PWM reference signal; and a pulse width modulated signal generator operable to provide the pulse width modulated signal to control the on time of the PFC circuit, wherein the pulse width modulated signal generator utilizes the PWM reference signal to generate the pulse width modulated signal.

12. The circuit of claim 11, wherein the feed forward loop device provides sinusoidal shape information of the AC line voltage, such that the pulse width modulated signal produced by the pulse width modulated signal generator drives the boost converter circuit to provide a substantially sinusoidal inductor current.

13. The circuit of claim 11, wherein the control circuit further comprises:

a zero crossing detector receiving the rectified half-sinusoidal AC voltage signal and providing an angle signal indicating the phase of the AC line voltage; and a vector rotator adapted to receive the angle signal and the rectified half-sinusoidal AC voltage signal and to provide a clean sinusoidal reference signal to be provided to the multiplier.

14. The circuit of claim 13, further comprising:
a partial PFC device operable to provide a blanking signal to the pulse width modulated signal generator to disable the pulse width modulated signal generator under predetermined conditions.

15. The circuit of claim 11, further comprising:
a partial PFC device operable to provide a blanking signal to the pulse width modulated signal generator to disable the pulse width modulated signal generator under predetermined conditions.

16. A digital control circuit for use with a power factor correction circuit comprising:

a voltage regulator providing a regulated voltage signal based on a reference voltage and a DC bus voltage of the power factor correction circuit;

a multiplier operable to multiply the regulated voltage signal by a rectified input voltage of the power factor correction circuit to provide a current reference signal;

a current regulator receiving the current reference signal and a signal proportional to an inductor current of the power factor correction circuit, wherein the current regulator further comprises:

a difference device operable to subtract the signal proportional to the inductor current from the current reference signal, a PI controller adapted to receive the output of the difference device and provide a first control signal;

a feed forward device operable to receive the rectified input voltage and to provide a second control signal, wherein the second control signal has a smaller dynamic range than the AC input voltage of the power factor correction circuit;

an adder operable to add the first control signal to the second control signal to provide a PWM reference signal; and a pulse width modulated signal generator operable to provide a pulse width modulated signal to control the on time of the power factor correction circuit, wherein the pulse width modulated signal generator utilizes the PWM reference signal to generate the pulse width modulated signal.

17. The digital control circuit of claim 16, wherein the feed forward loop device provides sinusoidal shape information of the AC input voltage of the power factor correction circuit, such that the pulse width modulated signal produced by the pulse width modulated signal generator drives the power factor correction circuit to provide a substantially sinusoidal inductor current.

18. The digital control circuit of claim 16, further comprising:

a zero crossing detector receiving the rectified input voltage of the power factor correction circuit and providing an angle signal indicating the phase of the input voltage; and a vector rotator adapted to receive the angle signal and the rectified input voltage and to provide a clean sinusoidal reference signal in phase with the AC input voltage of the power factor correction circuit and to provide the clean sinusoidal reference signal to the multiplier.

19. The digital control circuit of claim 18, further comprising:
a partial PFC device that provides a blanking signal to the pulse width modulated signal generator to disable the pulse width modulated signal generator under predetermine conditions.

20. The digital control circuit of claim 16 further comprising:
a partial PFC device that provides a blanking signal to the pulse width modulated signal generator to disable the pulse width modulated signal generator under predetermine conditions.

* * * * *